(12) United States Patent
Young et al.

(10) Patent No.: US 12,533,091 B2
(45) Date of Patent: Jan. 27, 2026

(54) OBJECT VISUALISATION IN X-RAY IMAGING

(71) Applicant: KONINKLIJKE PHILIPS N.V., Eindhoven (NL)

(72) Inventors: Stewart Matthew Young, Hamburg (DE); Daniel Bystrov, Hamburg (DE); Sven Kroenke-Hille, Hamburg (DE); Heiner Matthias Brueck, Pinneberg (DE); Jens Von Berg, Hamburg (DE); Tim Philipp Harder, Ahrensburg (DE); André Goossen, Sr., Eldena (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 156 days.

(21) Appl. No.: 18/687,635

(22) PCT Filed: Aug. 25, 2022

(86) PCT No.: PCT/EP2022/073633
§ 371 (c)(1),
(2) Date: Feb. 28, 2024

(87) PCT Pub. No.: WO2023/031001
PCT Pub. Date: Mar. 9, 2023

(65) Prior Publication Data
US 2024/0366162 A1   Nov. 7, 2024

(30) Foreign Application Priority Data
Sep. 2, 2021  (EP) ..................... 21194588

(51) Int. Cl.
*A61B 6/08* (2006.01)
*A61B 6/00* (2006.01)
*A61B 6/46* (2024.01)

(52) U.S. Cl.
CPC .............. *A61B 6/08* (2013.01); *A61B 6/4452* (2013.01); *A61B 6/461* (2013.01)

(58) Field of Classification Search
CPC .............. A61B 34/10; A61B 2034/107; A61B 2090/365; A61B 17/1703; A61B 17/155;
(Continued)

(56) References Cited

U.S. PATENT DOCUMENTS 10,702,224 B1   7/2020  Vanhooser
2003/0225325 A1  12/2003  Kagermeier
(Continued)

FOREIGN PATENT DOCUMENTS

| CN | 113906479 A * | 1/2022 | ............. G06T 19/20 |
| WO | WO2022136204 A1 | 6/2022 | |
| WO | WO2023020865 A1 | 2/2023 | |

OTHER PUBLICATIONS

PCT International Search Report, International application No. PCT/EP2022/073633, Dec. 5, 2022.
(Continued)

*Primary Examiner* — Don K Wong
(74) *Attorney, Agent, or Firm* — Larry Liberchuk

(57) ABSTRACT

An X-ray imaging system (100) includes an X-ray source (110) and an X-ray detector (120) that are separated by an examination region (150) for performing an X-ray imaging operation on an object (160). A processor (140) is configured to identify (S120) one or more internal structures (180) within the object (160), based on a comparison of depth sensor data representing a three-dimensional surface (170) of the object (160), with an anatomical model comprising the one or more internal structures (180). The processor (140) is also configured to compute (S130), using the depth sensor data and the identified one or more internal structures (180), a surface projection (190) of the one or more internal
(Continued)

structures, on the surface (170) of the object (160), from a perspective of the X-ray source (110); and to output (S140) an image representation of the surface projection (190) for displaying as an overlay on the surface (170) of the object (160).

15 Claims, 10 Drawing Sheets

(58) Field of Classification Search
CPC ............ A61B 17/157; A61B 2017/568; A61B 2034/104; A61B 2090/3762; A61B 2034/105; A61B 2034/102; A61B 2034/108; A61B 5/0077; A61B 2090/364; A61B 8/466; A61B 6/5229
See application file for complete search history.

(56) References Cited

U.S. PATENT DOCUMENTS

| | | |
|---|---|---|
| 2014/0348296 A1 | 11/2014 | Goossen |
| 2015/0003674 A1 | 1/2015 | Eun |
| 2016/0213329 A1 | 7/2016 | Heinrich |
| 2016/0287192 A1 | 10/2016 | Cai |
| 2017/0119338 A1 | 5/2017 | Merckx |
| 2018/0247427 A1 | 8/2018 | Geiger |
| 2019/0069871 A1 | 3/2019 | Tkacyk |
| 2019/0183439 A1 | 6/2019 | Clemens |
| 2020/0029919 A1 | 1/2020 | Senegas |
| 2020/0100757 A1 | 4/2020 | Senegas |
| 2020/0375546 A1 | 12/2020 | Shoudy |
| 2021/0093284 A1 | 4/2021 | Sutter |
| 2021/0401391 A1 | 12/2021 | Young |

OTHER PUBLICATIONS

Reed S. et al., "Augmented Reality Turns a Sandbox into a Geoscience Lesson", EOS 97 (2016). https://www.youtube.com/watch?v=Ki8UXSJmrJE.

* cited by examiner

OBJECT VISUALISATION IN X-RAY IMAGING

FIELD OF THE INVENTION

The present disclosure relates to visualising an object during X-ray imaging. An X-ray imaging system, a computer-implemented method, and a computer program product, are disclosed.

BACKGROUND OF THE INVENTION

X-ray imaging systems include an X-ray source and an X-ray detector. The X-ray source and the X-ray detector are separated by an examination region. An object may be disposed in the examination region in order to perform an X-ray imaging operation on the object. In order to avoid the need for repeat X-ray images, and the associated increase in X-ray dose, it is important that the object to be imaged is correctly positioned with respect to the X-ray imaging system.

By way of an example, in skeletal imaging of a knee or ankle joint, it is important to ensure that the X-rays rays pass through the desired portion of the joint. A further consideration may be that the X-rays pass through the joint within a desired angular range such that the joint, and potentially other anatomical structures, are aligned in a desired way in the resulting image.

The positioning of objects with respect to X-ray imaging systems is conventionally performed by eye, or via a monitor that displays a visible, or red-green-blue "RGB" camera image of the object. The extent of X-rays emitted by the X-ray source on the object is often indicated by projecting onto the object a light field indicative of the collimation window of the X-ray source. The X-ray detector's radiation-sensitive region is typically indicated on the radiation-receiving surface of the detector by way of markings. In-use, an operator positions the object with respect to the X-ray detector by eye, or via the monitor, using the light field and the markings on the surface of the detector.

However, the conventional approaches for positioning objects with respect to X-ray imaging systems have drawbacks. In particular, the positions of internal structures such as skeletal features are hidden. In order to ensure that the desired portion of the anatomy is imaged, the operator typically palpates a patient to confirm the locations of such skeletal features. However, palpation takes time and hampers workflow. The operator may also acquire an initial X-ray image of the patient and use the initial image to determine a more optimal positioning of the patient. However, repeating the acquisition of X-ray images in this manner increases the X-ray dose to the patient.

Consequently, there is a need to improve the way in which objects are positioned with respect to X-ray imaging systems.

A document US 2019/0183439 A1 discloses a method for positioning a body region of a patient for a radiography acquisition by a radiography system. The method includes providing an examination requirement for the body region; pre-positioning the body region in the radiography system for the radiography acquisition; pre-positioning an acquisition unit of the radiography system for the radiography acquisition; producing a three-dimensional positioning acquisition of the body region using a 3D camera system; producing a preview image from the three-dimensional positioning acquisition, wherein a patient model is generated from the three-dimensional positioning acquisition and the preview image is produced from the patient model, and wherein the preview image depicts a representation as if made using the acquisition unit of the radiography system as intended in the pre-positioning adopted; and outputting at least one of the preview image and positioning information based on the preview image. An apparatus and computer readable medium are also disclosed.

Another document US 2016/0213329 A1 discloses an x-ray recording system that contains an X-ray emitter for generating a beam used for imaging, an imaging X-ray detector with a two-dimensional or three-dimensional recording geometry for determining the attenuation of the rays of the beam, a patient bearing and/or positioning device for a patient in a recording region of the X-ray recording system between the X-ray emitter and the X-ray detector. A time of flight (TOF) camera is arranged for establishing the contour of the patient and a computer with a memory and software stored therein is present, which computer unit is embodied, during operation, to generate a three-dimensional wire model of the patient with joint locations arranged therein from the contour of the patient recorded by the TOF camera and to simulate and display at least one anatomical structure scaled to the wire model.

Another document US 2020/0029919 A1 discloses that the appropriate positioning of a patient in an X-Ray imaging system can present difficulties for medical professional owing, on one hand to the small size of important anatomical aspects which need to be captured in X-Ray images, and on the other hand to the significant movements in a field of view presented by a typical patient. The document proposes to obtain an image of the position of a patient in the field of view at approximately the same time that an initial X-Ray image is obtained. If it proves necessary to obtain a subsequent X-Ray image with updated field of view settings (for example, collimation parameters), the movement of the patient at the point of taking the second image is factored into the provision of updated field of view settings.

SUMMARY OF THE INVENTION

According to one aspect of the present disclosure, an X-ray imaging system is provided. The X-ray imaging system includes an X-ray source, an X-ray detector, a depth sensor, and a processor. The X-ray source and the X-ray detector are separated by an examination region for performing an X-ray imaging operation on an object when the object is received within the examination region. The depth sensor is configured to generate depth sensor data representing a three-dimensional surface of the object when the object is received within the examination region. The processor is configured to:
  receive the depth sensor data;
  identify one or more internal structures within the object, based on a comparison of the depth sensor data, with an anatomical model comprising the one or more internal structures;
  compute, using the depth sensor data and the identified one or more internal structures, a surface projection of the one or more internal structures, on the surface of the object, from a perspective of the X-ray source; and
  output an image representation of the surface projection for displaying as an overlay on the surface of the object.

The surface projection of the internal structures is provided from a perspective of the X-ray source. It may therefore be used to provide accurate guidance in positioning the internal structures that are to be imaged under X-ray.

As a consequence, the need to re-take X-ray images may be reduced, limiting the X-ray dose to the object.

Further aspects, features, and advantages of the present disclosure will become apparent from the following description of examples, which is made with reference to the accompanying drawings.

DETAILED DESCRIPTION OF EMBODIMENTS

Figure 1:
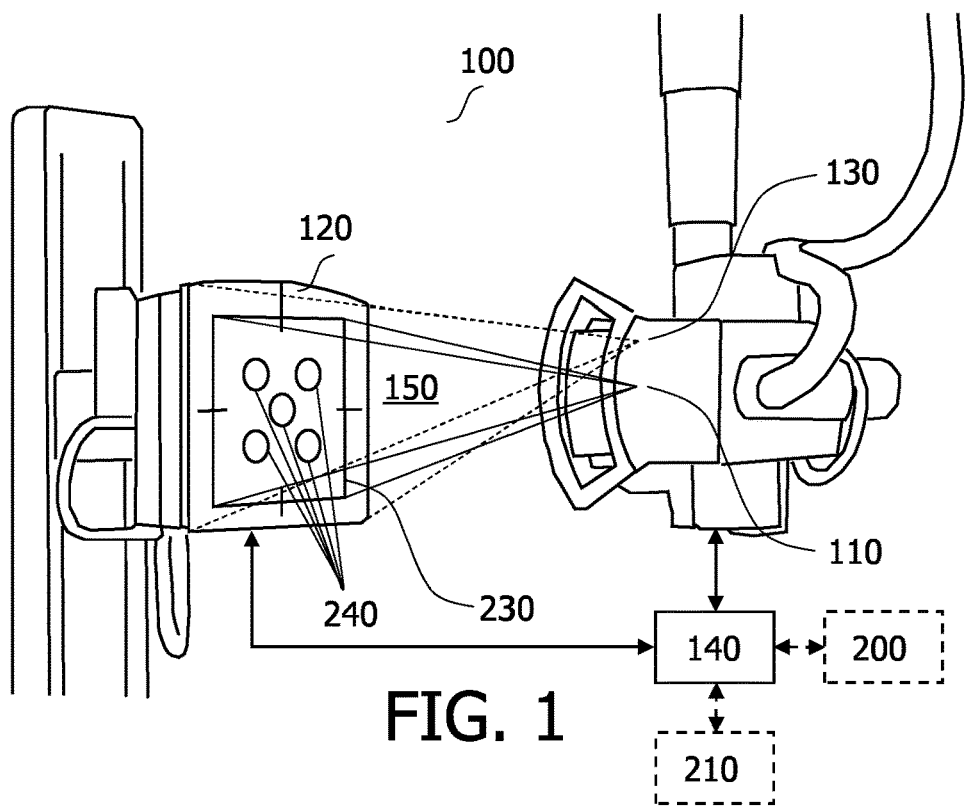
FIG. 1 is a schematic diagram illustrating a first perspective of an example X-ray imaging system 100 including an X-ray source 110 and an X-ray detector 120, in accordance with some aspects of the present disclosure.

Examples of the present disclosure are provided with reference to the following description and figures. In this description, for the purposes of explanation, numerous specific details of certain examples are set forth. Reference in the specification to "an example". "an implementation" or similar language means that a feature, structure, or characteristic described in connection with the example is included in at least that one example. It is also to be appreciated that features described in relation to one example may also be used in another example, and that all features are not necessarily duplicated in each example for the sake of brevity. For instance, features described in relation to an X-ray imaging system, may be implemented in a computer-implemented method, and in a computer program product, in a corresponding manner.

In the following description, reference is made to an X-ray imaging system. The X-ray imaging system may for example be the DigitalDiagnost C90 marketed by Philips Healthcare, Best, The Netherlands. Alternatively the X-ray imaging system may be another type of X-ray imaging system. In some examples, the X-ray source of the X-ray imaging system is mounted to a ceiling via a gantry, and the corresponding X-ray detector is mounted to a stand and held in the vertical position. However, examples of the present disclosure are not limited to this particular arrangement, and it is to be appreciated that the X-ray source and X-ray detector may alternatively be mounted in a different manner, and also held in different positions.

In the following description, reference is made to various methods that are implemented by a processor, i.e. a computer. It is noted that the computer-implemented methods disclosed herein may be provided as a non-transitory computer-readable storage medium including computer-readable instructions stored thereon, which, when executed by at least one processor, cause the at least one processor to perform the method. In other words, the computer-implemented methods may be 10 implemented in a computer program product. The computer program product can be provided by dedicated hardware, or hardware capable of running the software in association with appropriate software. When provided by a processor, the operations performed in the method can be provided by a single dedicated processor, or by a single shared processor, or by a plurality of individual processors, some of which can be shared. The operations performed in the method may for instance be provided by processors that are shared within a networked processing architecture such as a client/server architecture, the internet, or the cloud.

The explicit use of the terms "processor" or "controller" should not be interpreted as exclusively referring to hardware capable of running software, and can implicitly include, but is not limited to, digital signal processor "DSP" hardware, read only memory "ROM" for storing software, random access memory "RAM", a non-volatile storage device, and the like. Furthermore, examples of the present disclosure can take the form of a computer program product accessible from a computer-usable storage medium, or a computer-readable storage medium, the computer program product providing program code for use by or in connection with a computer or any instruction execution system. For the purposes of this description, a computer-usable storage medium or a computer readable storage medium can be any apparatus that can comprise, store, communicate, propagate, or transport a program for use by or in connection with an instruction execution system, apparatus, or device. The medium can be an electronic, magnetic, optical, electromagnetic, infrared, or a semiconductor system or device or propagation medium. Examples of computer-readable media include semiconductor or solid state memories, magnetic tape, removable computer disks, random access memory "RAM", read-only memory "ROM", rigid magnetic disks and optical disks. Current examples of optical disks include compact disk-read only memory "CD-ROM", compact disk-read/write "CD-R/W". Blu-Ray™ and DVD.

As mentioned above, in order to avoid the need for repeat X-ray images and the associated increase in X-ray dose, it is important that an object to be imaged is correctly positioned with respect to an X-ray imaging system.

FIG. 1 is a schematic diagram illustrating a first perspective of an example X-ray imaging system 100 including an X-ray source 110 and an X-ray detector 120, in accordance with some aspects of the present disclosure. The X-ray imaging system 100 also includes a depth sensor 130, and a processor 140. The X-ray source 110 and the X-ray detector 120 are separated by an examination region 150 for performing an X-ray imaging operation on an object 160 when the object is received within the examination region. The X-ray source and X-ray detector are typically maintained in a static position during the imaging operation. The object may for example be a portion of the human body, or indeed any object. In the illustrated example, the X-ray source 110 is mounted to the ceiling via a gantry, and the X-ray detector 120 is mounted to a stand and held in the vertical position. Alternative arrangements, mounting configurations, and positions of the X-ray source 110 and the X-ray detector 120 may also be used.

Figure 2:
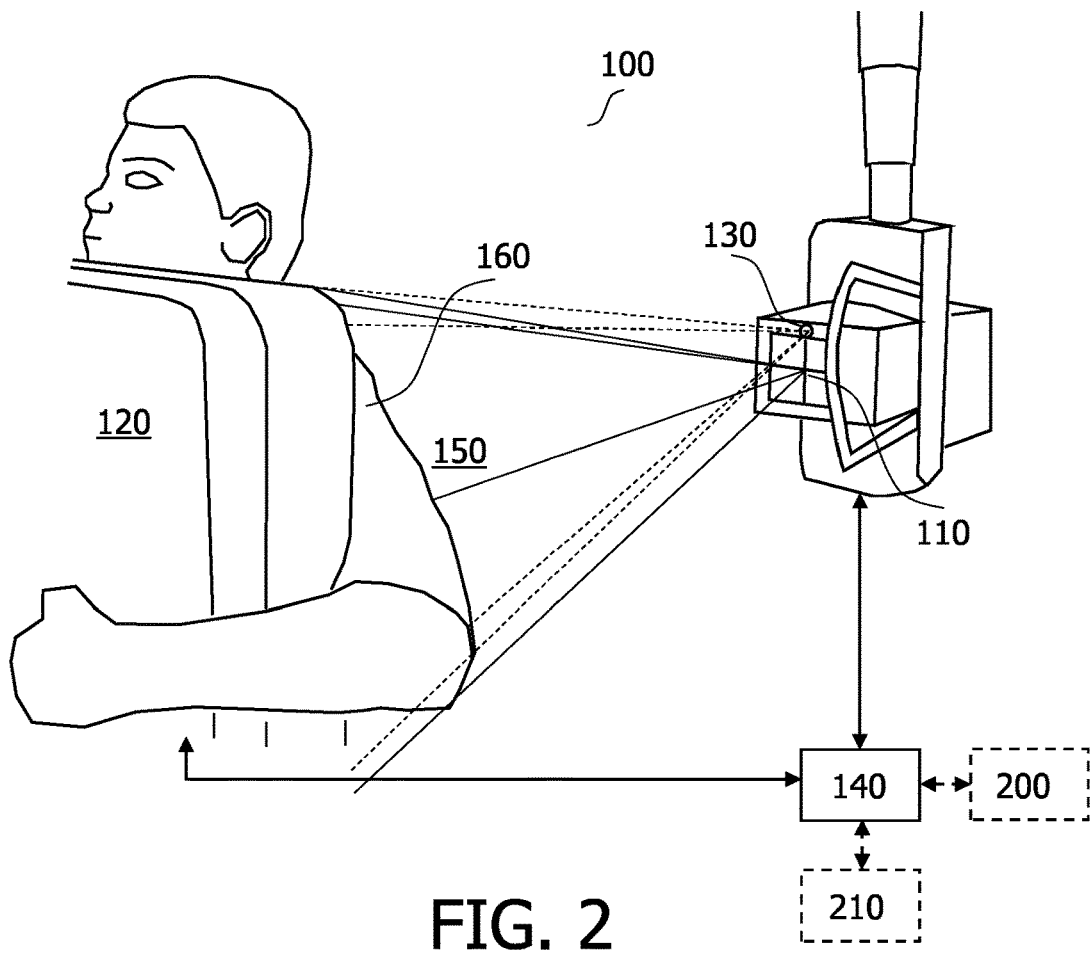
FIG. 2 is a schematic diagram illustrating a second perspective of an example X-ray imaging system 100 including an X-ray source 110 and an X-ray detector 120, in accordance with some aspects of the present disclosure.

FIG. 2 is a schematic diagram illustrating a second perspective of an example X-ray imaging system 100 including an X-ray source 110 and an X-ray detector 120, in accordance with some aspects of the present disclosure. As compared to FIG. 1, the perspective illustrated in FIG. 2 more clearly illustrates the position of the X-ray source 110 and the depth sensor 130. Also, in FIG. 2, an example object 160 in the form of a patient, is received within the examination region 150 in order to perform an X-ray imaging operation on the patient. In FIG. 2, a chest X-ray imaging operation is to be performed on the patient. The solid lines extending between the X-ray source 110 and the X-ray detector 120 in FIG. 1 and FIG. 2 indicate the volumetric extent of the overlap between the X-ray beam emitted by the X-ray source 110, and the X-ray radiation-sensitive region of the X-ray detector 120, and within which the X-ray image data may be generated. The volumetric extent of this overlap defines the examination region 150. A perimeter of the X-ray radiation-sensitive region 230 of the X-ray detector 120 may be marked on the radiation-receiving surface of the X-ray detector, as illustrated in FIG. 1. The X-ray detector 120 may also include one or more radiation dose measurement sensors for generating X-ray dose data. The positions of the radiation dose measurement sensors may be indicated on the radiation receiving surface of the X-ray detector 120 as radiation dose-measurement regions 240. The radiation dose measurement sensors are sometimes referred-to as automatic exposure control "AEC" chambers. In-use, the radiation dose measurement sensors may serve to limit an exposure time of X-ray irradiation based on the detected dose. In the illustrated example in FIG. 1, there are five radiation dose-measurement regions 240 and these have a circular shape. In other examples the radiation dose-measurement regions 240 may have a different shape, and there may be a different number such regions, or even none at all.

In-use, it is desirable that the object 160 illustrated in FIG. 2 is correctly positioned with respect to the X-ray imaging system. More specifically, it is desirable that the object is correctly positioned with respect to the X-ray radiation-sensitive region 230 and/or the one or more radiation dose-measurement regions 240, of the X-ray detector 120, and the X-ray source 110. In the example illustrated in FIG. 1 and FIG. 2, this is facilitated using the depth sensor 130.

In general, a depth sensor generates depth sensor data representing a range between the depth sensor and a plurality of points on the surface of objects within the depth sensor's field of view. Various types of depth sensors are known. These include depth cameras that employ a time-of-flight, or LIDAR principle, depth cameras that employ a structured light principle, and depth cameras that employ a binocular stereo vision principle. The use of one or more of such depth sensors is contemplated for use in the examples illustrated in FIG. 1 and FIG. 2. In some examples a single depth sensor may be used to view the examination region, and thereby provide depth sensor data from a single perspective. However, the use of multiple depths sensors is also contemplated. Multiple depth sensors may be arranged to view the examination region, and thus provide depth sensor data from different perspectives. The depth sensor data from the different perspectives may also be combined to provide depth sensor data from a single perspective, and this may even be a different perspective to the perspectives of the individual depth sensors.

In the time-of-flight, or LIDAR principle, the time taken for emitted light pulses to travel from the position of the camera to objects in a scene and back again, is used to generate depth sensor data in the form of image data representing the range to the surface of the object. The Azure Kinect DK depth camera, and the Intel RealSense™ LiDAR Camera L515 are examples of depth cameras that employ this principle. In the structured light principle, an optical pattern is projected onto the surface of objects within a scene, and the disparity between the original projected pattern, and the pattern that is deformed by the surface of the objects is imaged by one or more cameras. In the binocular stereo vision principle, different views of a scene are used to provide depth sensor data in the form of a depth map representing the scene. Some depth cameras are capable of generating optical image data representing a two-dimensional image of the surface of the object, as well as the depth sensor data. Such cameras are often referred-to as RGB-D cameras. The optical image data may represent a visible or infrared portion of the optical spectrum. The use of such RGB-D cameras is also contemplated in the system illustrated in FIG. 1 and FIG. 2, as described in more detail below.

In the example system 100 illustrated in FIG. 1 and FIG. 2, the depth sensor 130 has a field of view, the minimum extent of which is indicated by dotted lines. In general, the field of view of the depth sensor 130 includes the X-ray detector, and also overlaps a portion of the examination region 150. In FIG. 1 and FIG. 2, the depth sensor 130 is arranged such that a common surface of an object 160 received within the examination region 150 is within the fields of view of both the X-ray source 110 and the depth sensor 130. In so doing, the depth sensor 130 illustrated in FIG. 1 and FIG. 2 is configured to generate depth sensor data representing a three-dimensional surface 170 of the object 160 when the object is received within the examination region 150.

In the example arrangement illustrated in FIG. 1 and FIG. 2, the depth sensor 130 is mechanically coupled to the X-ray source 110. The depth sensor 130 is also offset with respect to an axis passing through the X-ray source 110 and a centre of the X-ray detector 120. However, it is noted that the depth sensor 130 may alternatively be positioned differently in order to generate depth sensor data representing the three-dimensional surface 170 of the object 160 when the object is received within the examination region 150. For example, the depth sensor 130 may be mechanically coupled to a wall, or to a ceiling of a room in which the X-ray imaging system 100 is located. Alternatively, the depth sensor 130 may be mechanically coupled to a floor-based stand in the room. The depth sensor may alternatively be mobile. In some examples, the depth sensor may therefore be capable of being moved around a room in which the X-ray imaging system 100 is located.

The processor 140 illustrated in FIG. 1 and FIG. 2 is configured to receive the depth sensor data. The processor 140 may receive the depth sensor data via any form of digital communication. The processor 140 may receive the depth sensor data directly or indirectly from the depth sensor 130. The processor 140 and the depth sensor 130 may for example be in communication with each other via a direct wired or wireless communication path, such as an electrical cable or ethernet, or a wireless infrared or RF communication path such as Bluetooth, as illustrated by the arrows connecting these items in FIG. 1 and FIG. 2. Alternatively, the communication path between the depth sensor 130 and the processor 140 may be indirect. For example, the depth sensor 130 and the processor 140 may be in communication with one another via the internet, via the cloud, or via a computer readable storage medium.

Moreover, the processor 140 illustrated in FIG. 1 and FIG. 2 is also configured to:
  identify S120 one or more internal structures 180 within the object 160, based on a comparison of the depth sensor data, with an anatomical model comprising the one or more internal structures 180;
  compute S130, using the depth sensor data and the identified one or more internal structures 180, a surface projection 190 of the one or more internal structures, on the surface 170 of the object 160, from a perspective of the X-ray source 110; and
  output S140 an image representation of the surface projection 190 for displaying as an overlay on the surface 170 of the object 160.

Figure 9:
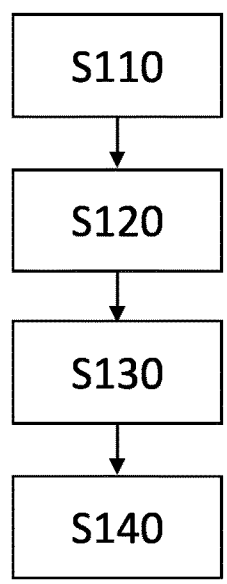
FIG. 9 is a flowchart illustrating an example of a method of generating an image representation, in accordance with some aspects of the present disclosure.

The operations performed by the processor are illustrated in FIG. 9, which is a flowchart illustrating an example of a method of generating an image representation, in accordance with some aspects of the present disclosure. These operations result in a surface projection of the internal structures that is provided from a perspective of the X-ray source. The surface projection may be used to provide accurate guidance in positioning the internal structures that are to be imaged under X-ray. As a consequence, the need to re-take X-ray images may be reduced, limiting the X-ray dose to the object.

The operations performed by the processor 140 are described below in more detail with reference to FIG. 1-FIG. 9.

Figure 3:
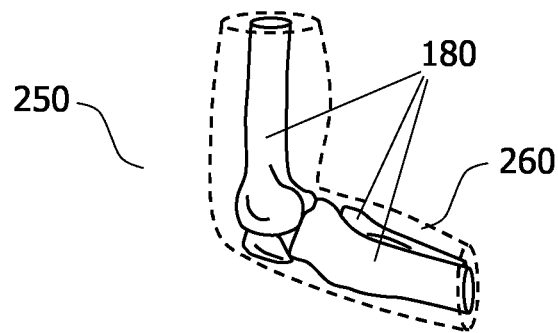
FIG. 3 is a schematic diagram illustrating an example of an anatomical model 250 including internal structures 180, in accordance with some aspects of the present disclosure.

In the operation S120, one or more internal structures 180 within the object 160, are identified based on a comparison of the depth sensor data, with an anatomical model comprising the one or more internal structures 180. FIG. 3 is a schematic diagram illustrating an example of an anatomical model 250 including internal structures 180, in accordance with some aspects of the present disclosure. The example anatomical model 250 represents the knee, and includes internal bone structures 180. However, in general the anatomical model may represent any portion of the human body. It may for example represent a limb, a torso, a hand, and so forth. The internal structures 180 may in general be any type of internal structure including bone, soft tissues such as organs, muscles, tendons, ligaments, and so forth. The anatomical model 250 includes a surrounding tissue 260 that defines a surface of the anatomical model. The surrounding tissue may include muscle, fat, and skin, for example. The depth sensor data represents a three-dimensional surface 170 of the object 160, and in the operation S120, the internal structures 180 are identified by comparing, or in other words, fitting, the three-dimensional surface 170 of the object 160 represented by the depth sensor data, to the surface of the anatomical model.

In some examples the anatomical model 250 comprises three or more dimensions. The anatomical model may for example include three spatial dimensions. The anatomical model may include three spatial dimensions and a fourth, time dimension. In some examples, the anatomical model comprises one or more kinematic joints, and wherein the anatomical model comprises at least one degree of freedom. The kinematic joints may have degrees of freedom such as rotation and sliding.

In some examples, the anatomical model 250 that is used in the operation S120 is provided by a plurality of X-ray images representing the object. The images may represent different views of the object. In other examples, the anatomical model 250 may be provided by a computed tomography image representing the object, or by a magnetic resonance image representing the object. In other words, the plurality of X-ray images, the computed tomography image, and the magnetic resonance image may have been generated from the object in the examination region, or they may have been generated from a same type of object as the object in the examination region. In the former case, X-ray, computed tomography, and magnetic resonance images may be available from a historic imaging procedure on the object. Such images typically include an indication of the surface of the anatomy. Such images may be available from a historic imaging procedure on the object. In these examples, the anatomical model may be registered to the depth sensor data representing the three-dimensional surface 170 of the object 160 in the operation S120. More specifically, the comparison of the depth sensor data, with the anatomical model, may be include registering the anatomical model to the depth sensor data representing the three-dimensional surface 170 of the object 160. The registration may be rigid or elastic. The registration may therefore include operations such as translating, rotating, and scaling a size of the anatomical model in order to fit the model to the depth sensor data. The anatomical model may be fitted such that a best fit is found between a portion of the object surface in the model, and the corresponding portion of the object surface in the depth sensor data.

The anatomical model 250 used in the operation S120 may be selected from an anatomical atlas, or from a database of anatomical models representing the object. The anatomical model may be selected based on various object parameters such as a gender, or a dimension, of the object in the examination region 150, and so forth. The anatomical model may be selected automatically, or by an operator. For example, the anatomical model may be selected automatically by analysing the depth sensor data to determine a dimension of the object, and selecting the anatomical model using the determined dimension. The selected model may also be registered to the depth sensor data representing the three-dimensional surface 170 of the object 160 in the operation S120, as described above for the example of the anatomical model 250 that is provided by a computed tomography image.

In one example, the operations of identifying S120 one or more internal structures within the object, and computing S130 a surface projection 190 of the one or more internal structures, are performed using a machine learning algorithm. In this example, the machine learning algorithm may be trained to predict the surface projection of the internal structures from data representing a surface of the object. The training data in this example may be provided synthetically from magnetic resonance images. For example, the ground truth data might include synthetic depth sensor data that corresponds to a view of a surface of the object from the position of the depth sensor, and synthetic surface projection data that is generated by projecting the internal structures from the magnetic resonance images, onto a surface of the object, as seen from a position of the X-ray source.

In so doing, the operation S120 results in the identification of internal structures that would not be visible simply from visual inspection of the surface of the object.

In the operation S130, a surface projection 190 of the one or more internal structures, on the surface 170 of the object 160, is computed using the depth sensor data and the identified one or more internal structures 180, from a perspective of the X-ray source 110. This operation is illustrated with reference to FIG. 4, which is a schematic diagram illustrating an example arrangement including an X-ray source 110, an X-ray detector 120, a depth sensor 130, and a processor 140, in accordance with some aspects of the present disclosure. The arrangement illustrated in FIG. 4 corresponds to a section through the schematic diagrams illustrated in FIG. 1 and FIG. 2, and further includes internal structures 180 within the object 160. The internal structures 180 may for example represent bones, or another type of internal structure. In the arrangement illustrated in FIG. 4, the X-ray source and the X-ray detector are separated by an examination region 150, as in FIG. 1 and FIG. 2. The X-ray source 110 and the X-ray detector 120 may likewise be used to perform an X-ray imaging operation on an object 160 that is disposed in the examination region 150. The X-ray source 110 generates X-ray radiation within a volumetric beam defined by solid angle $\Omega_x$, and which is detected by the X-ray detector 120 in order to generate X-ray image data. A depth sensor 130, is located at an offset position with respect to an axis passing through the X-ray source 110 and a centre of the X-ray detector 120. The depth sensor 130 has a field of view, the minimum extent of which is indicated by dotted lines and the solid angle $\Omega_{ds}$. As described above with regard to FIG. 1 and FIG. 2, the depth sensor 130 is configured to generate depth sensor data representing a three-dimensional surface 170 of the object 160 when the object is received within the examination region 150.

Figure 4:
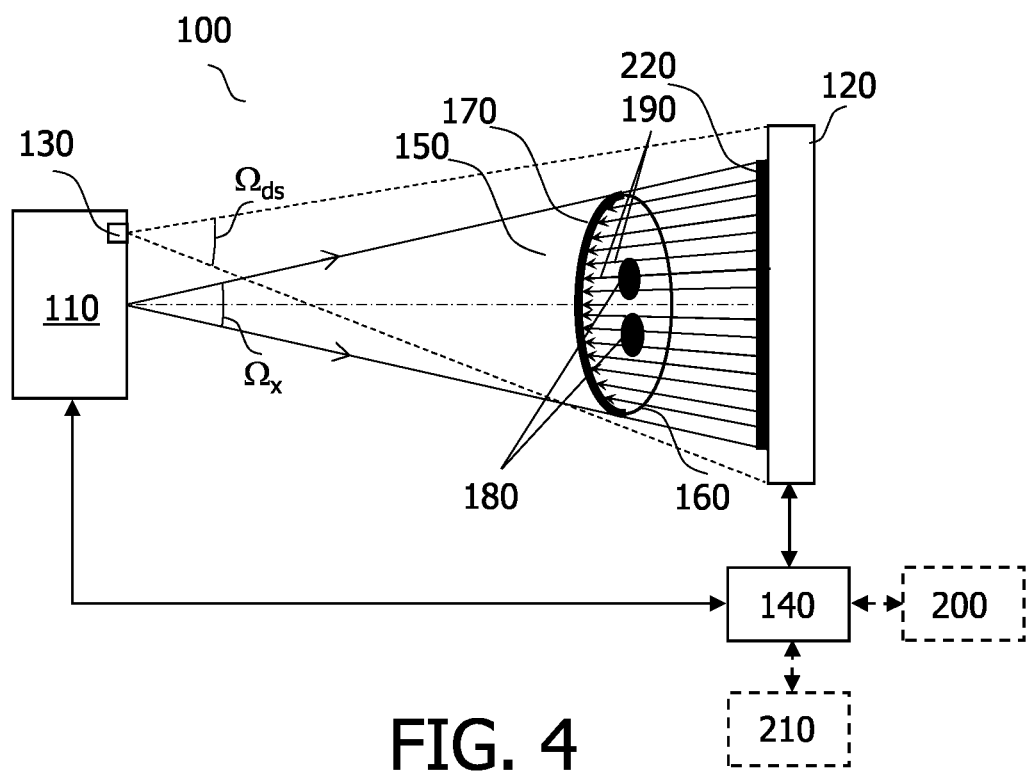
FIG. 4 is a schematic diagram illustrating an example arrangement including an X-ray source 110, an X-ray detector 120, a depth sensor 130, and a processor 140, in accordance with some aspects of the present disclosure.

With reference to FIG. 4, in the operation S130, the surface projection 190 of the one or more internal structures 180 from a perspective of the X-ray source 110, is computed by back-projecting the positions of the internal structures 180 identified in the model, along the virtual paths of X-rays emitted by the X-ray source 110, and onto the three-dimensional surface 170 of the object 160 that is provided by the depth sensor data. This projection is performed in a mathematical sense, and is illustrated by way of the arrowed lines that converge towards the X-ray source 110 in FIG. 4, and which represent the virtual paths of the X-rays. In one example, a correction for an offset position of the depth sensor 130 with respect to the X-ray source may also be applied. In this example, the surface projection may be computed based further on a transform relating the relative positions of the depth sensor 130, the X-ray source 110, and the X-ray detector 120. The determination of these relative positions is described in more detail below.

Figure 5:
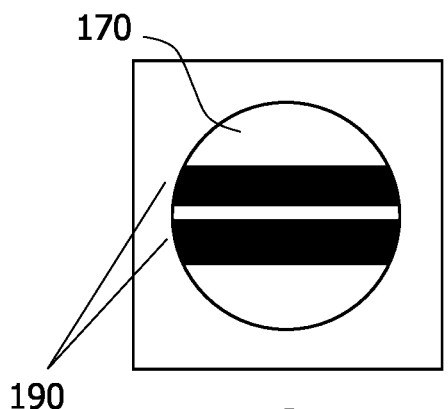
FIG. 5 is a schematic diagram illustrating an example of a surface projection 190 of internal structures 180, on the surface 170 of an object 160, from a perspective of an X-ray source 110, in accordance with some aspects of the present disclosure.
Figure 6:
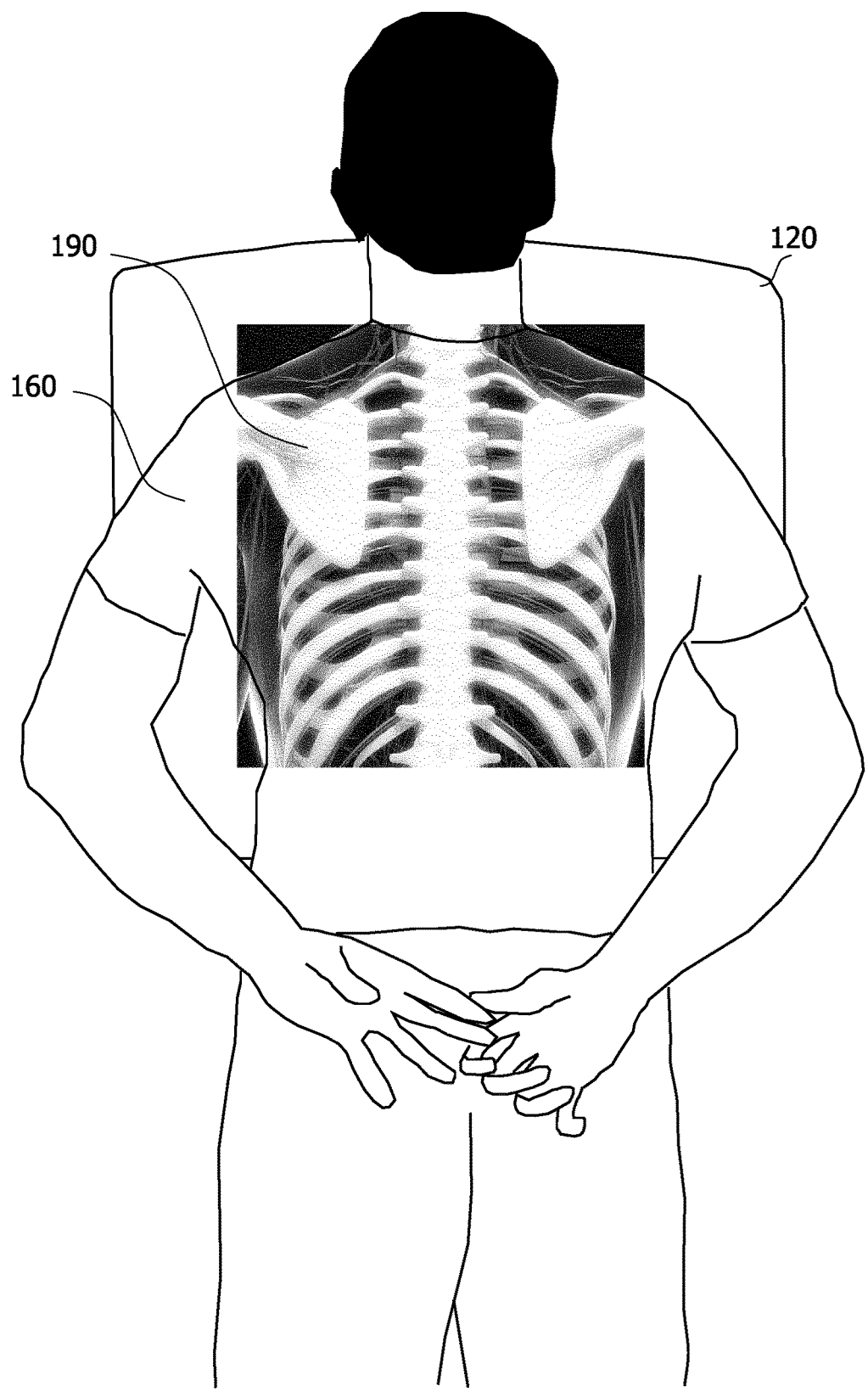
FIG. 6 is a schematic diagram illustrating a first example of a surface projection 190 that is displayed as an overlay on the surface of an object 160, in accordance with some aspects of the present disclosure.

FIG. 5 is a schematic diagram illustrating an example of a surface projection 190 of internal structures 180, on the surface 170 of an object 160, from a perspective of an X-ray source 110, in accordance with some aspects of the present disclosure. The surface projection 190 illustrated in FIG. 5 may be generated by the arrangement illustrated in FIG. 4. Thus, the two internal structures 180 in FIG. 4, and which extend into the plane of the drawing, appear as horizontal bars in FIG. 5 when projected onto the surface 170 of the object 160.

The effect of providing the surface projection from a perspective of the X-ray source, is to provide an accurate depiction of the internal structures as they would appear on the surface of the object, as seen by the X-ray source 110. This type of view is sometimes referred-to as a beam eye view since it provides a view of the projected internal structures from the perspective of the beam emitted by the X-ray source. The surface projection 190 may firstly be used to verify that the correct internal structures are within the field of view of the X-ray imaging system, prior to exposing the object to X-rays. Secondly, the surface projection 190 may be used to verify that the internal structures are aligned in the correct manner. For example, an operator may readily see from the surface projection 190 in FIG. 5 whether the two internal structures 180 in FIG. 4, are separated, or whether the object 180 should be rotated in order to prevent that their surface projections overlap each other. In both cases the surface projection may therefore be used limit the X-ray dose to the object by reducing the need to re-take the X-ray image.

In the operation S140, an image representation of the surface projection 190 is outputted for displaying as an overlay on the surface 170 of the object 160. The image representation 190 may be outputted to a display, or to a projector, for example.

In one example, the X-ray imaging system 100 illustrated in FIG. 1. FIG. 2 and FIG. 4 further includes a display 200, and the processor 140 is further configured to output to the display an overlay image comprising the image representation of the surface projection 190, and the depth sensor data representing the surface of the object. Providing an overlay image with the image representation of the surface projection 190, and the depth sensor data, provides a topographic image of the internal features on the surface of the object, and may provide the operator with an improved understanding of the positioning of the object with respect to the X-ray imaging system. The overlay image may be generated by techniques such as setting the pixel values of one of the two images to partially transparent and combining corresponding pixel values in the images. Alternatively, corresponding pixel values in the images may be combined by replacing the pixel values in one of the images with the corresponding pixel values in the other image.

In another example, the X-ray imaging system 100 illustrated in FIG. 1. FIG. 2 and FIG. 4, also includes a display 200. In this example, the depth sensor 130 is further configured to generate optical image data representing a two-dimensional surface of the object. The depth sensor 130 may for example be an RGB-D camera, that provides depth data representing a 3D surface of the object, as well as optical image data representing a two-dimensional surface of the object. In this example, the processor 140 is further configured to output to the display an overlay image comprising the image representation of the surface projection 190, and the optical image data representing the two-dimensional surface of the object. This example differs from the previous example in that rather than displaying the image representation as a 3D representation, it is displayed as a 2D representation. The 2D representation may provide a view of the patient that is easier to interpret.

In another example, the X-ray imaging system 100 illustrated in FIG. 1. FIG. 2 and FIG. 4 also includes a projector 210. In this example, the processor 140 is further configured to output to the projector the image representation of the surface projection 190 for displaying as an overlay on the surface of the object. Various optical image projectors may be used for this purpose, such as for example the VPL laser projectors marketed by Sony Europe. B.V. Weybridge. UK. This example is illustrated with reference to FIG. 6, which is a schematic diagram illustrating a first example of a surface projection 190 that is displayed as an overlay on the surface of an object 160, in accordance with some aspects of the present disclosure. In the example illustrated in FIG. 7, the object 160 is a patient, and the internal structures are bones within a torso of the patient. The surface projection 190 therefore includes the ribs, a portion of the spine, and the scapulae, and these are projected onto the torso of the patient. In the illustrated example, the surface projection 190 is provided in grayscale, however in other examples one or more colours may be used to depict different internal structures.

Figure 7:
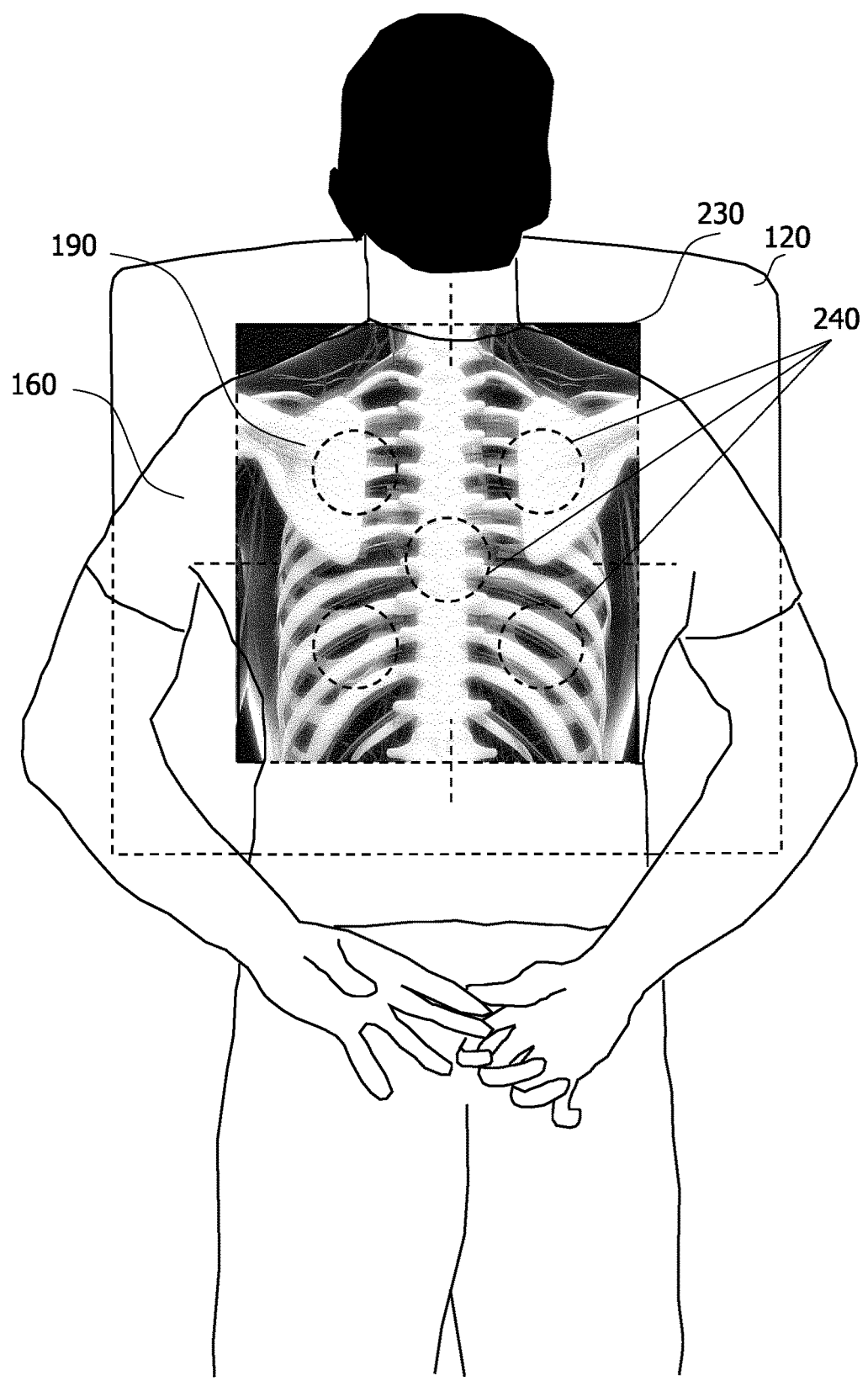
FIG. 7 is a schematic diagram illustrating a second example of a surface projection 190 that is displayed as an overlay on the surface of an object 160, in accordance with some aspects of the present disclosure.

In some examples, additional information may also be included in the surface projection 190 in order to provide further guidance to an operator aligning the object 160 with respect to the X-ray imaging system. This additional information may be outputted to the display 200, or to the projector 210 described above. For example, an image representation of the radiation dose-measurement regions 240 and/or an image representation of the radiation-sensitive region 230 of the X-ray detector and/or an image representation of the collimation window, may also be outputted. By way of an example. FIG. 7 is a schematic diagram illustrating a second example of a surface projection 190 that is displayed as an overlay on the surface of an object 160, in accordance with some aspects of the present disclosure. In this example, image representations of both the radiation-sensitive region 230, and the radiation dose-measurement regions 240, are projected onto the surface of the patient. Providing this additional information is useful because when the object is disposed in the examination region 150, the object typically obscures the markings on the surface of the X-ray detector 120 that indicate the extent of these regions. Thus, it may be ensured that the desired internal structures, such as the ribs in FIG. 7, are imaged during a subsequent X-ray imaging operation.

In the above examples, the surface projection of the internal structures is provided from a perspective of the X-ray source 110. This type of view is sometimes referred-to as a beam eye view since it provides a view from the perspective of the beam emitted by the X-ray source. However, this type of view may appear unintuitive, particularly when outputted to a display as an overlay image on an image generated by a camera that is offset with respect to an axis passing through the X-ray source and a centre of the X-ray detector 120. A more intuitive view may be provided by generating an image representation of the projected overlay image data 220 from a perspective of the depth sensor 130. Thus, in one example, the X-ray imaging system 100 illustrated above in FIG. 1. FIG. 2 and FIG. 4, further includes a display 200, and the processor 140 is further configured to:

generate overlay image data representing the image representation of the surface projection 190, and the depth sensor data representing the surface 170 of the object 160;

project the overlay image data onto a radiation-receiving surface of the X-ray detector 120, from a perspective of the X-ray source 110;

generate an image representation of the projected overlay image data 220 on the radiation-receiving surface of the X-ray detector 120, from a perspective of the depth sensor 130; and output the generated image representation of the projected overlay image data 220, to the display 200.

The operations relating to this example are described in more detail with reference to FIG. 4. In this example, the first step of generating overlay image data, involves combining the depth sensor data with the surface projection 190. This overlay image data can be visualised as the thick curved black line on the surface of the object 160 in FIG. 4. The second step can be visualised as the projection of the thick curved black line onto the surface of the X-ray detector to provide the thick straight black line on the surface of the detector 120. The third step can be visualised as an image representation of the thick straight black line, from the perspective of the depth sensor. These projections are performed in a mathematical sense, and may be computed based on the relative positions of the depth sensor 130, the X-ray source 110, and the X-ray detector 120.

The relative positions of the depth sensor 130, the X-ray source 110, and the X-ray detector 120 may be determined from calibration data, or alternatively they may be determined from position sensor data. The calibration data may represent discrete positions of each of the depth sensor 130, the X-ray source 110, and the X-ray detector 120. The discrete positions may be selectable. For example, a height of the X-ray detector may selectable from one of an integer number of fixed mechanical positions, and a sensor may indicate which of the positions is currently selected. Alternatively various types of position sensors may be used to provide position sensor data representing the relative positions of the depth sensor 130, the X-ray source 110, and the X-ray detector 120. Position sensors that employ optical, radiofrequency "RF", or ultrasound tracking techniques may be used, for example. Examples of suitable position sensors include rotational and translational position encoders, laser-based optical rangefinders. RF and ultrasound ranging transponders, and optical cameras that are configured to track the positions of fiducial markers disposed on one or more of the X-ray source 110, the X-ray detector 120, and the depth sensor 130. Another example of a position sensor is a depth camera that is configured to track the positions of one or more of the X-ray source 110, the X-ray detector 120, and the depth sensor 130.

In another example, the system 100 described above with reference to FIG. 1. FIG. 2 and FIG. 4, outputs corrective actions for guiding an operator to obtain a desired pose of the structures within the object. This enables the operator to more accurately position the object with respect to the X-ray imaging system, and thus helps to reduce the need to re-take an X-ray image. In this example, the processor 140 is further configured to:

compare an actual pose of the identified one or more internal structures within the object 160, with a desired pose of the one or more internal structures;

compute one or more corrective actions for reducing a difference between the actual pose and the desired pose; and output the corrective actions.

Figure 8:
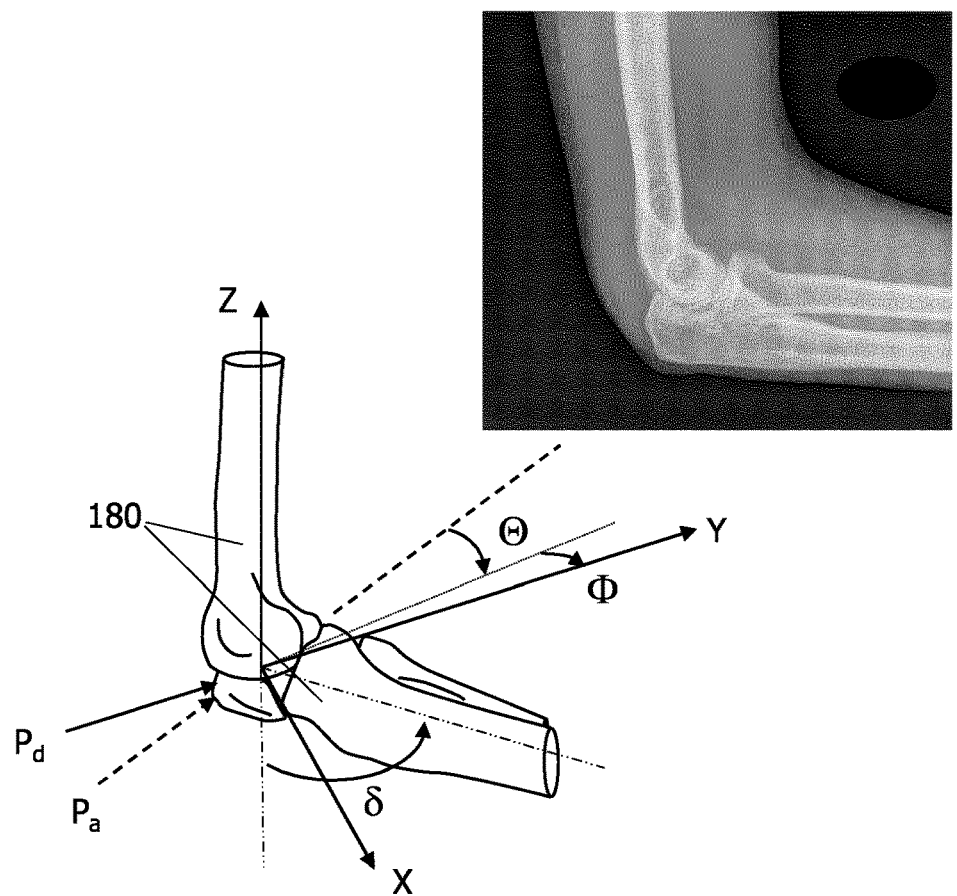
FIG. 8 is a schematic diagram illustrating an example of an anatomical model including internal structures 180 having an actual pose $P_a$, and a desired pose $P_d$, in accordance with some aspects of the present disclosure.

This example is described with reference to FIG. 8, which is a schematic diagram illustrating an example of an anatomical model including internal structures 180 having an actual pose $P_a$, and a desired pose $P_d$, in accordance with some aspects of the present disclosure. In FIG. 8, the actual pose, i.e. current positions and orientations of the internal structures 180 of the anatomical model, are illustrated, and $P_a$ represents an axis passing through the X-ray source and a centre of the X-ray detector 120. In this example, the actual pose may be determined from the positions of the of the one or more internal structures in the fitted anatomical model. The actual pose of the internal structures 180 may be represented by the parameters of a 6-degrees of freedom "6-DOF" anatomical model, and wherein the axis passing through the X-ray source as a reference orientation, and the centre of the detector as a reference position. Similarly, the desired pose $P_d$ may be expressed as a desired position and orientation of the internal structures of the anatomical model. The desired pose $P_d$ may be determined based on clinical recommendations, or based on a previous X-ray image of the object. The desired pose for the portion of the object may be stored in a lookup table, and selected by an operator during an X-ray imaging procedure. In the illustrated example, the desired pose $P_d$ may be obtained by adjusting the orientation of the anatomical model through the angles Θ and Φ illustrated in FIG. 8.

In this example, the operation of comparing an actual pose of the identified one or more internal structures within the object 160, with a desired pose, may include comparing the parameters of the 6-DOF model of the internal structures 180 in their current positions, with the parameters of a 6-DOF model of the internal structures in their desired positions. The operation of computing one or more corrective actions for reducing a difference between the actual pose and the desired pose, may include determining one or more differences in degrees of freedom represented by the model. These may include translations and/or rotations and/or changes in a flexion angle, the latter being represented by the symbol δ in FIG. 8, of the internal structures. The translations and/or rotations may also include an associated magnitude and/or a direction. These transformations are then outputted as corrective actions. For example, the transformations may include corrective actions such as "Rotate 10 degrees about X-axis". Translate 20 centimetres along Y axis", and so forth. The operations of comparing the actual pose, computing one or more corrective actions, and outputting the corrective actions, may be performed once, or they may be performed multiple times. For example, these operations may be performed repetitively until a difference between the actual pose and the desired pose is within a predetermined value.

As mentioned above, in some examples, the system 100 described above with reference to FIG. 1. FIG. 2 and FIG. 4, includes a projector, and in other examples the system 100 includes a display. The corrective actions may be outputted to the display and/or to the projector. The corrective actions may be outputted in text format and/or in graphical format. Corrective actions in a graphical format may for example include generating an arrow that is indicative of a direction of the corrective action, and wherein a size of the arrow is indicative of the magnitude of the corrective action. Corrective actions in a graphical format may also be provided in the form of an animation. Instead of, or in addition to outputting the corrective actions to a display or a projector, the corrective actions may be outputted in audio format. In one example, the one or more corrective actions are outputted to a projector for displaying on the object 160. In this example, the projector may be aligned with the X-ray imaging system, and thus with the object, thereby providing that the corrective actions are displayed on the object itself. This may provide more intuitive guidance to the operator in re-positioning the object.

In one example, the positioning of the object is performed iteratively, and using an X-ray image representing the object. In this example, the operations of receiving S110 the depth sensor data, identifying S120 one or more internal structures 180 within the object 160, computing S130 a surface projection 190 of the one or more internal structures, and outputting S140 an image representation of the surface projection 190 are performed in at least a first and a second iteration. In the first iteration, the anatomical model corresponding to the object is selected from an anatomical atlas, or from a database of anatomical models representing the object 160, and the selected anatomical model is registered to the object 160, and the first iteration further comprises generating an X-ray image representing the object 160. In the second iteration, the anatomical model is provided by the X-ray image generated during the first iteration.

In this example, the X-ray image that is used in the second iteration may be registered to the object as described above. In this example, the second iteration may provide a more accurate indication of the internal structures. Thus, more accurate guidance may be provided by this example, which further helps to limit the total number of X-ray images that are ultimately acquired in order to obtain the desired X-ray image of the object. This consequently reduces the X-ray dose to the object, and also improves workflow.

A computer-implemented method, and a computer program product, are also provided in accordance with other examples. The example method is illustrated with reference to FIG. 9, which is a flowchart illustrating an example of a method of generating an image representation, in accordance with some aspects of the present disclosure.

With reference to FIG. 9, a computer-implemented method of generating an image representation using an X-ray source 110, an X-ray detector 120, and a depth sensor 130, wherein the X-ray source 110 and the X-ray detector 120 are separated by an examination region 150 for performing an X-ray imaging operation on an object 160 when the object is received within the examination region, and wherein the depth sensor 130 is configured to generate depth sensor data representing a three-dimensional surface 170 of the object 160 when the object is received within the examination region; is provided. The method comprises:

receiving S110 the depth sensor data;

identifying S120 one or more internal structures 180 within the object 160, based on a comparison of the depth sensor data, with an anatomical model comprising the one or more internal structures 180;

computing S130, using the depth sensor data and the identified one or more internal structures 180, a surface projection 190 of the one or more internal structures, on the surface 170 of the object 160, from a perspective of the X-ray source 110; and outputting S140 an image representation of the surface projection 190 for displaying as an overlay on the surface 170 of the object 160.

With continued reference to FIG. 9, a computer program product comprising instructions which when executed by one or more processors, cause the one or more processors to carry out a method of generating an image representation using an X-ray source 110, an X-ray detector 120, and a depth sensor 130, wherein the X-ray source 110 and the X-ray detector 120 are separated by an examination region 150 for performing an X-ray imaging operation on an object 160 when the object is received within the examination region, and wherein the depth sensor 130 is configured to generate depth sensor data representing a three-dimensional surface 170 of the object 160 when the object is received within the examination region 150: is also provided. The method comprises:

receiving the depth sensor data;
identifying one or more internal structures 180 within the object 160, based on a comparison of the depth sensor data, with an anatomical model comprising the one or more internal structures 180;
computing, using the depth sensor data and the identified one or more internal structures 180, a surface projection 190 of the one or more internal structures 180, on the surface 170 of the object 160, from a perspective of the X-ray source 110; and
outputting an image representation of the surface projection 190 for displaying as an overlay on the surface 170 of the object 160.

A second set of aspects of the present disclosure, are now described. These relate to enumerated Examples 1-12 below. The second set of aspects relate to an alternative system for improving the way in which an object is positioned with respect to an X-ray imaging system, and which is described in more detail below with reference to FIGS. 10-17. In this second set of aspects, a surface projection of internal structures is also generated. In contrast to the examples described above, this surface projection is generated without the need for a depth sensor.

Example 1

An X-ray imaging system (300) comprising:
an X-ray source (310);
an X-ray detector (320);
a processor (340);
wherein the X-ray source (310) and the X-ray detector (320) are separated by an examination region (350) for performing an X-ray imaging operation on an object (360) when the object is received within the examination region;
wherein the processor (340) is configured to:
receive (S310) X-ray image data, the X-ray image data representing one or more internal structures (380) within the object (360) when the object is received within the examination region (350);
receive (S320) an anatomical model (430) representing the object (360), the anatomical model including the one or more internal structures (380), and a surrounding tissue (440) that defines a surface of the anatomical model;
map (S330) the one or more internal structures (380) from the anatomical model (430) to the one or more corresponding internal structures (380) represented in the X-ray image data, such that the surface of the anatomical model provides an estimated object surface (450) for the one or more internal structures represented in the X-ray image data;
compute (S340), using the anatomical model (430), a surface projection (390) of the one or more internal structures (380), on the estimated object surface (450), from a perspective of the X-ray source (310); and
output (S350) an image representation of the surface projection (390) for displaying as an overlay on the surface (370) of the object (360).

Example 2

The X-ray imaging system according to Example 1, further comprising a projector (410), and wherein the processor (340) is further configured to output to the projector the image representation of the surface projection (390) for displaying as an overlay on the surface (370) of the object (360).

Example 3

The X-ray imaging system according to Example 1 or Example 2, wherein the X-ray imaging system (100) further comprises:
a camera (330); and
a display (400);
wherein the camera (330) is configured to generate optical image data representing a two-dimensional surface (370) of the object (360) when the object is received within the examination region (350); and
wherein the processor (340) is further configured to output to the display (400) an overlay image comprising the image representation of the surface projection (390), and the optical image data representing the two-dimensional surface (370) of the object (360).

Example 4

The X-ray imaging system according to Example 1, wherein the operations of mapping (S330) the one or more internal structures, and computing (S340) a surface projection of the one or more internal structures, are performed using a machine learning algorithm.

Example 5

The X-ray imaging system according to c Example 1, wherein the processor (340) is further configured to:
compare an actual pose of the identified one or more internal structures (380) within the object (360), with a desired pose of the one or more internal structures;
compute one or more corrective actions for reducing a difference between the actual pose and the desired pose; and
output the corrective actions.

Example 6

The X-ray imaging system according to Example 5, further comprising a display (400) and/or a projector (410), and wherein the processor (340) is further configured to:
output the one or more corrective actions to the display (400) and/or output the one or more corrective actions to the projector (410) for displaying on the object (160).

Example 7

The X-ray imaging system according to any one of Examples 5-6, wherein the one or more corrective actions represent one or more translations and/or one or more rotations, and wherein the one or more corrective actions comprise a magnitude and/or a direction.

Example 8

The X-ray imaging system according to any one of Examples 1-7, wherein the anatomical model comprises three or more dimensions.

Example 9

The X-ray imaging system according to Example 8 wherein the anatomical model comprises one or more kinematic joints, and wherein the anatomical model comprises at least one degree of freedom.

Example 10

The X-ray imaging system according to any one or Examples 1-9, wherein the anatomical model (430) is provided by one or more of: a computed tomography image representing the object, a magnetic resonance image representing the object.

Example 11

The X-ray imaging system according to any one of Examples 1-9, wherein the processor (340) is further configured to select the anatomical model from an anatomical atlas, or from a database of anatomical models representing the object.

As mentioned above, in order to avoid the need for repeat X-ray images and the associated increase in X-ray dose, it is important that an object to be imaged is correctly positioned with respect to an X-ray imaging system.

Figure 10:
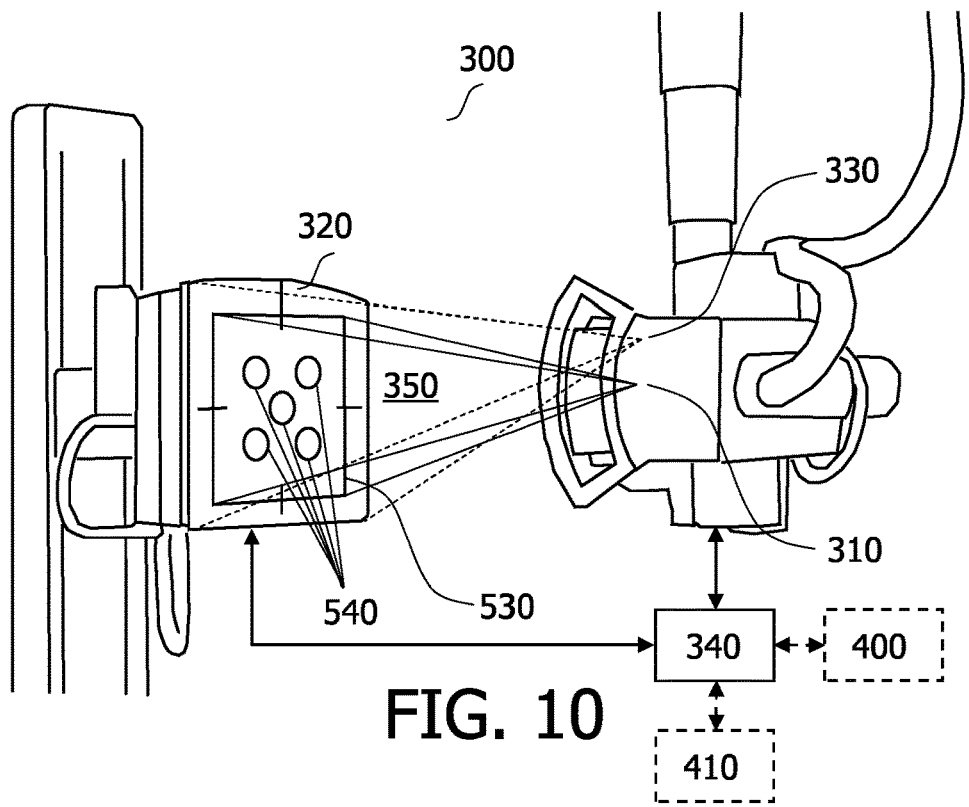
FIG. 10 is a schematic diagram illustrating a first perspective of an example X-ray imaging system 300 including an X-ray source 310 and an X-ray detector 320, in accordance with a second set of aspects of the present disclosure.

FIG. 10 is a schematic diagram illustrating a first perspective of an example X-ray imaging system 300 including an X-ray source 310 and an X-ray detector 320, in accordance with a second set of aspects of the present disclosure. The X-ray imaging system 300 also includes a processor 340. The X-ray source 310 and the X-ray detector 320 are separated by an examination region 350 for performing an X-ray imaging operation on an object 160 when the object is received within the examination region. The X-ray source and X-ray detector are typically maintained in a static position during the imaging operation. The object may for example be a portion of the human body, or indeed any object. In the illustrated example, the X-ray source 310 is mounted to the ceiling via a gantry, and the X-ray detector 320 is mounted to a stand and held in the vertical position. Alternative arrangements, mounting configurations, and positions of the X-ray source 310 and the X-ray detector 320 may also be used.

Figure 11:
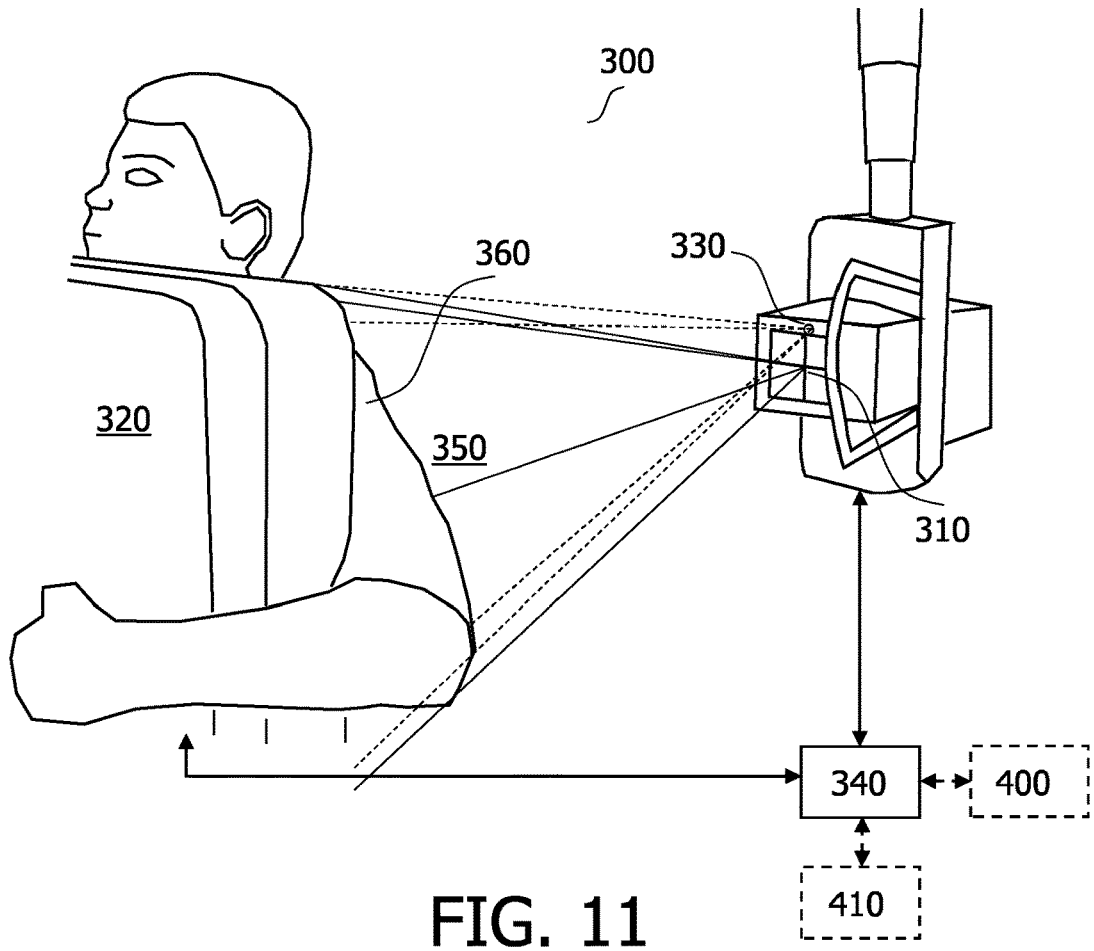
FIG. 11 is a schematic diagram illustrating a second perspective of an example X-ray imaging system 300 including an X-ray source 310 and an X-ray detector 320, in accordance with a second set of aspects of the present disclosure.

FIG. 11 is a schematic diagram illustrating a second perspective of an example X-ray imaging system 300 including an X-ray source 310 and an X-ray detector 320, in accordance with a second set of aspects of the present disclosure. As compared to FIG. 10, the perspective illustrated in FIG. 11 also includes an example object 360 in the form of a patient. The patient is received within the examination region 350 in order to perform an X-ray imaging operation on the patient. In FIG. 11, a chest X-ray imaging operation is to be performed on the patient. The solid lines extending between the X-ray source 310 and the X-ray detector 320 in FIG. 10 and FIG. 11 indicate the volumetric extent of the overlap between the X-ray beam emitted by the X-ray source 310, and the X-ray radiation-sensitive region of the X-ray detector 320, and within which the X-ray image data may be generated. The volumetric extent of this overlap defines the examination region 350. A perimeter of the X-ray radiation-sensitive region 530 of the X-ray detector 320 may be marked on the radiation-receiving surface of the X-ray detector, as illustrated in FIG. 10. The X-ray detector 320 may also include one or more radiation dose measurement sensors for generating X-ray dose data. The positions of the radiation dose measurement sensors may be indicated on the radiation receiving surface of the X-ray detector 320 as radiation dose-measurement regions 540. The radiation dose measurement sensors are sometimes referred-to as automatic exposure control "AEC" chambers. In-use, the radiation dose measurement sensors may serve to limit an exposure time of X-ray irradiation based on the detected dose. In the illustrated example in FIG. 10, there are five radiation dose-measurement regions 540 and these have a circular shape. In other examples the radiation dose-measurement regions 540 may have a different shape, and there may be a different number such regions, or even none at all.

In-use, it is desirable that the object 360 illustrated in FIG. 11 is correctly positioned with respect to the X-ray imaging system. More specifically, it is desirable that the object is correctly positioned with respect to the X-ray radiation-sensitive region 530 and/or the one or more radiation dose-measurement regions 540, of the X-ray detector 320, and the X-ray source 310. In the example illustrated in FIG. 10 and FIG. 11, this is facilitated using X-ray image data, and an anatomical model. With reference to FIG. 10 and FIG. 11, the processor 340 is configured to:

receive S310 X-ray image data, the X-ray image data representing one or more internal structures 380 within the object 360 when the object is received within the examination region 350;

receive S320 an anatomical model 430 representing the object 360, the anatomical model including the one or more internal structures 380, and a surrounding tissue 440 that defines a surface of the anatomical model;

map S330 the one or more internal structures 380 from the anatomical model 430 to the one or more corresponding internal structures 380 represented in the X-ray image data, such that the surface of the anatomical model provides an estimated object surface 450 for the one or more internal structures represented in the X-ray image data;

compute S340, using the anatomical model 430, a surface projection 390 of the one or more internal structures 380, on the estimated object surface 450, from a perspective of the X-ray source 310; and output S350 an image representation of the surface projection 390 for displaying as an overlay on the surface 370 of the object 360.

Figure 12:
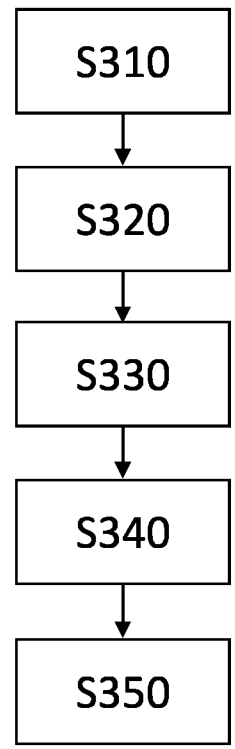
FIG. 12 is a flowchart illustrating an example of a method of generating an image representation, in accordance with a second set of aspects of the present disclosure.

The operations performed by the processor are illustrated in FIG. 12, which is a flowchart illustrating an example of a method of generating an image representation, in accordance with a second set of aspects of the present disclosure.

With reference to FIG. 12, in the operation S310, X-ray image data is received. The X-ray image data represents one or more internal structures 380 within the object 360 when the object is received within the examination region 350. The X-ray image data may be generated using the X-ray imaging system 300. The X-ray image data may therefore be received from the X-ray imaging system 300. Alternatively the X-ray image data may be provided by a previously-recorded X-ray image that is generated for the object some hours, days, weeks, months, or even years beforehand. Thus, the X-ray image data may be received from a database. In examples wherein the X-ray image data is generated using the X-ray imaging system 300, the X-ray image data may be provided by a scout scan that is generated in order to provide guidance on how to generate a subsequent, desired X-ray image. The scout scan may be generated with a lower X-ray dose than is used for the subsequent image. Alternatively, the X-ray image data may alternatively be provided by an X-ray image with a standard dose, and from which an operator seeks to provide an improved X-ray image.

Figure 13:
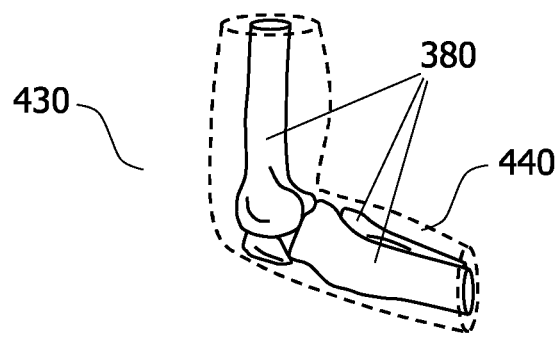
FIG. 13 is a schematic diagram illustrating an example of an anatomical model 430 including internal structures 380, in accordance with a second set of aspects of the present disclosure.

With reference to FIG. 12, in the operation S320 an anatomical model representing the object is received. FIG. 13 is a schematic diagram illustrating an example of an anatomical model 430 including internal structures 380, in accordance with a second set of aspects of the present disclosure. The example anatomical model 430 represents the knee, and includes internal bone structures 380. However, in general the anatomical model may represent any portion of the human body. It may for example represent a limb, a torso, a hand, and so forth. The internal structures 380 may in general be any type of internal structure including bone, soft tissues such as organs, muscles, tendons, ligaments, and so forth. The anatomical model 430 includes a surrounding tissue 440 that defines a surface of the anatomical model. The surrounding tissue may include muscle, fat, and skin, for example.

In some examples the anatomical model 430 comprises three or more dimensions. The anatomical model may for example include three spatial dimensions. The anatomical model may include three spatial dimensions and a fourth, time dimension. In some examples, the anatomical model comprises one or more kinematic joints, and wherein the anatomical model comprises at least one degree of freedom. The kinematic joints may have degrees of freedom such as rotation and sliding. In some examples, the anatomical model is provided by a computed tomography image representing the object. In other examples, the anatomical model is provided by a magnetic resonance image representing the object. In other words, the computed tomography image and the magnetic resonance image may have been generated from the object in the examination region, or they may have been generated from a same type of object as the object in the examination region. In the former case, computed tomography, and magnetic resonance images may be available from a historic imaging procedure on the object.

In some examples, the processor 340 is also configured to select the anatomical model 430 from an anatomical atlas, or from a database of anatomical models representing the object. The anatomical model may be selected based on various object parameters such as a gender, or a dimension, of the object in the examination region 350, and so forth. The anatomical model may be selected based on the received X-ray image data. For example, the X-ray image data may be analysed to determine a dimension of one or more of the internal structures represented in the X-ray image data, the anatomical model may be selected using the determined dimension. In these examples, the anatomical model is selected automatically. However, in other examples the model is selected based on user input. For example, an operator may specify that a previously-acquired computed tomography or magnetic resonance image of the object is to be used.

With reference to FIG. 12, in the operation S330, the one or more internal structures 380 from the anatomical model 430 are mapped to the one or more corresponding internal structures 380 represented in the X-ray image data. The mapping performed in the operation S330 may include the use a rigid or elastic registration. The registration may therefore include performing one or more translations, rotations, or scaling operations on the anatomical model such that the internal structures in the anatomical model are fitted to the corresponding structures in the X-ray image data. The mapping may be performed such that a best fit is found between the internal structures in the anatomical model, and the anatomical structures represented in the X-ray image data. In so doing, a bone in the anatomical model may be fitted to a corresponding bone in the X-ray image data, for example.

Figure 14:
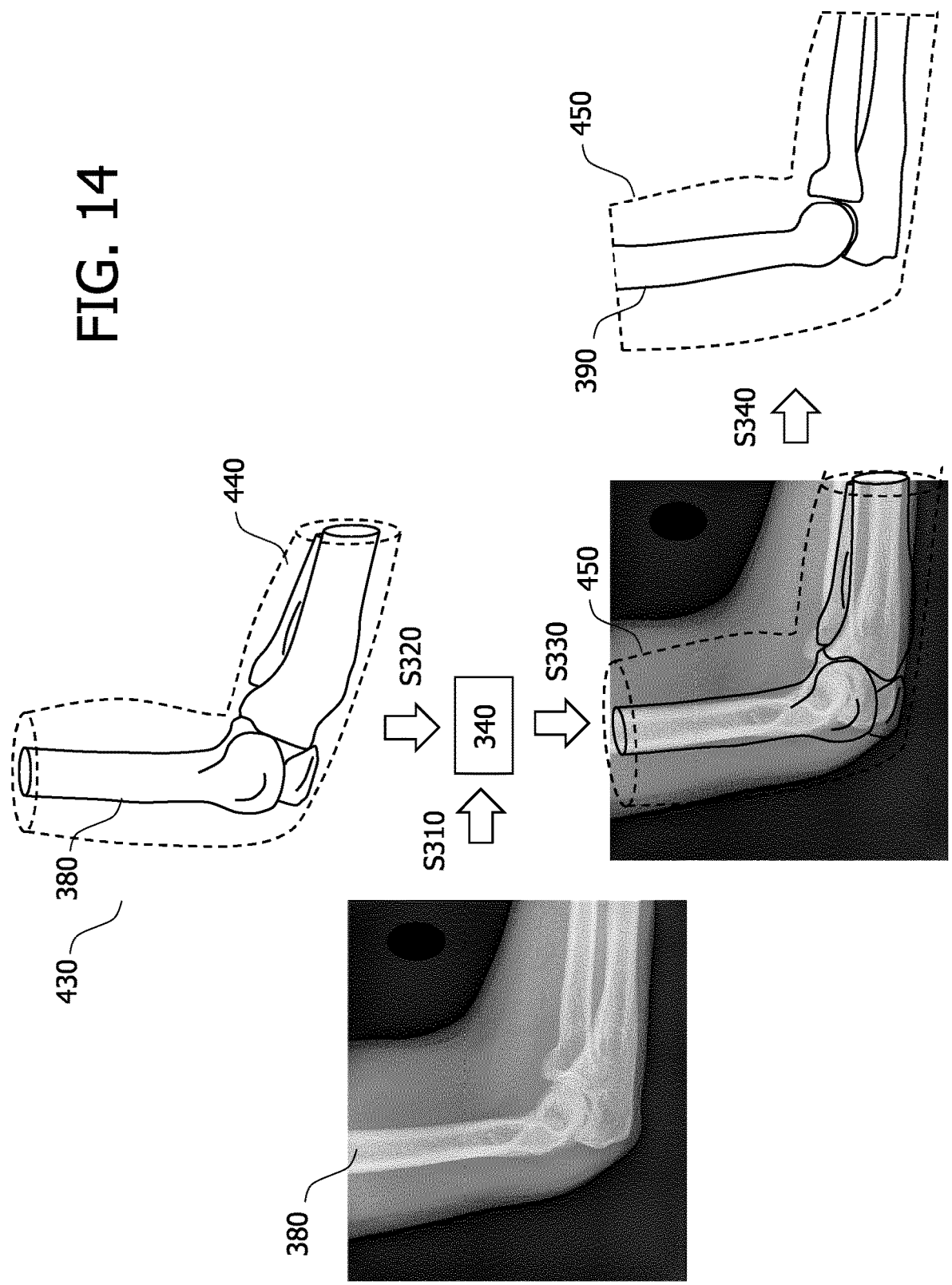
FIG. 14 is a schematic diagram illustrating an example of a method of generating an image representation, in accordance with a second set of aspects of the present disclosure.

The operation S330 is described with reference to FIG. 14, which is a schematic diagram illustrating an example of a method of generating an image representation, in accordance with a second set of aspects of the present disclosure. The operations illustrated schematically in FIG. 14 correspond to the operations in the flowchart of FIG. 12. In the operation S330, in FIG. 14 the internal structures 380 of the anatomical model 430 in the upper portion of FIG. 14, are fitted to the corresponding internal structures 380 in the X-ray image data that is illustrated on the left side of FIG. 14. This results in the fitted anatomical model illustrated in the lower central portion of FIG. 14. By performing this mapping operation, the surface of the anatomical model provides an estimated object surface 450 for the one or more internal structures represented in the X-ray image data. The estimated object surface 450 is illustrated in dashed lines in the lower central portion of FIG. 14.

With continued reference to FIG. 14, and to FIG. 12, in the operation S340, a surface projection 390 of the one or more internal structures 380, on the estimated object surface 450, is computed using the anatomical model 430. The surface projection 390 is computed from a perspective of the X-ray source 310. An example of a surface projection 390 is illustrated in the right portion of FIG. 14, wherein a surface projection 390 with a solid outline, is illustrated. The operation S340 is also described with reference to FIG. 15, which is a schematic diagram illustrating an example arrangement including an X-ray source 310, an X-ray detector 320, and a processor 340, in accordance with a second set of aspects of the present disclosure. The arrangement illustrated in FIG. 15 corresponds to a section through the schematic diagrams illustrated in FIG. 10 and FIG. 11, and further includes internal structures 380 within the object 360. The internal structures 380 may for example represent bone, soft tissues such as organs, muscles, tendons, ligaments, and so forth. In the arrangement illustrated in FIG. 15, the X-ray source and the X-ray detector are separated by an examination region 350, as in FIG. 10 and FIG. 11. The X-ray source 310 and the X-ray detector 320 may likewise be used to perform an X-ray imaging operation on an object 360 that is disposed in the examination region 350. The X-ray source 310 generates X-ray radiation within a volumetric beam defined by solid angle $\Omega_x$, and which is detected by the X-ray detector 320 in order to generate X-ray image data.

Figure 15:
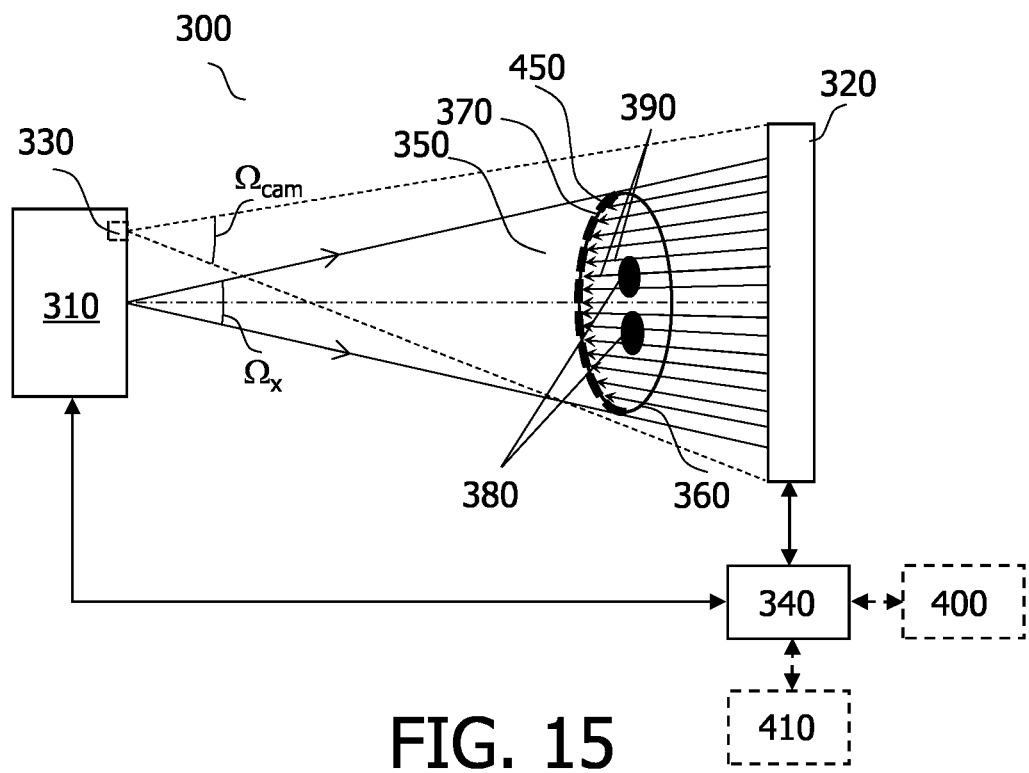
FIG. 15 is a schematic diagram illustrating an example arrangement including an X-ray source 310, an X-ray detector 320, and a processor 340, in accordance with a second set of aspects of the present disclosure.

With reference to FIG. 15, in the operation S340, the surface projection 390 of the one or more internal structures 380, on the estimated object surface 450, is computed from a perspective of the X-ray source 310. The surface projection 390 is computed by back-projecting the positions of the internal structures 380 in the model, along the virtual paths of X-rays emitted by the X-ray source 310, and onto the estimated object surface 450 that is provided by the anatomical model 430. This projection is performed in a mathematical sense, and is illustrated by way of the arrowed lines that converge towards the X-ray source 310 in FIG. 15, and which represent the virtual paths of the X-rays. The estimated object surface 450 is illustrated as a thick dashed curved black line, and is coincident with the actual surface of the object 370 that is illustrated as a thin black line surrounding the object 360 in FIG. 15.

In this example, the virtual paths of the X-rays can be traced because the plane of the of the X-ray detector is known from the X-ray image that is used in the operation S310, the position of the anatomical model with respect to the X-ray image is known from the fitting process performed in the operation S330, and the solid angle $\Omega_x$ of the volumetric beam of the X-ray source is also known from the X-ray detector.

Figure 16:
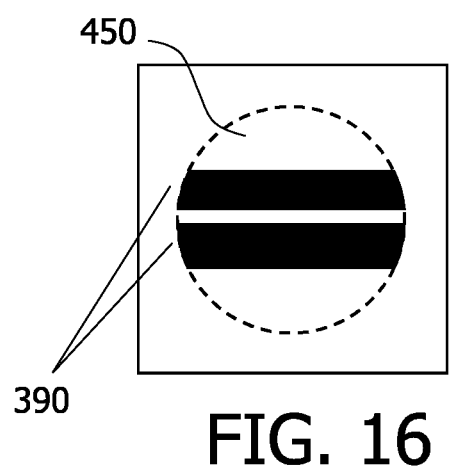
FIG. 16 is a schematic diagram illustrating an example of a surface projection 390 of internal structures 380, on an estimated object surface 450, from a perspective of an X-ray source 310, in accordance with a second set of aspects of the present disclosure.

FIG. 16 is a schematic diagram illustrating an example of a surface projection 390 of internal structures 380, on an estimated object surface 450, from a perspective of an X-ray source 310, in accordance with a second set of aspects of the present disclosure. The surface projection 390 illustrated in FIG. 16 may be generated by the arrangement illustrated in FIG. 15. Thus, the two internal structures 180 in FIG. 15, and which extend into the plane of the drawing, appear as horizontal bars in FIG. 16 when projected onto estimated object surface 450.

The effect of providing the surface projection 390 from a perspective of the X-ray source 310, is to provide an accurate depiction of the internal structures, as they would appear on the estimated object surface 450, as seen by the X-ray source 310. This type of view is sometimes referred-to as a beam eye view since it provides a view of the projected internal structures from the perspective of the beam emitted by the X-ray source. The surface projection 390 may firstly be used to verify that the correct internal structures are within the field of view of the X-ray imaging system, prior to exposing the object to X-rays. Secondly, the surface projection 390 may be used to verify that the internal structures are aligned in the correct manner. For example, an operator may readily see from the surface projection 390 in FIG. 16 whether the two internal structures 380 in FIG. 15, are separated, or whether the object 380 should be rotated in order to prevent that their surface projections overlap each other. In both cases the surface projection may therefore be used to limit the X-ray dose to the object by reducing the need to re-take the X-ray image.

In the operation S350, an image representation of the surface projection 390 is outputted for displaying as an overlay on the surface 370 of the object 360. The image representation 190 may be outputted to a display, or to a projector, for example. The surface projection of the internal structures may provide guidance to an operator to obtain a desired X-ray image of the object. As a consequence, the need to re-take X-ray images may be reduced, limiting the X-ray dose to the object.

In one example, the system 300 described with reference to FIG. 10, FIG. 11, and FIG. 15 further includes a projector 410. In this example, the processor 340 is further configured to output to the projector 410 the image representation of the surface projection 390 for displaying as an overlay on the surface 370 of the object 360. Various optical image projectors may be used for this purpose, such as for example the VPLlaser projectors marketed by Sony Europe. B.V. Weybridge. UK. In some examples the surface projection is provided in grayscale. However, in other examples it us contemplated to use one or more colours. Different colours may be used to depict different internal structures, for example.

In one example, the operations of mapping S330 the one or more internal structures, and computing S340 a surface projection of the one or more internal structures, are performed using a machine learning algorithm. In this example, a machine learning algorithm may be trained to predict the surface projection of the internal structures from X-ray image data. The training data in this example may be provided synthetically from computed tomography or magnetic resonance images. The ground truth data might include synthetic X-ray projection data, and synthetic surface projection data that are respectively generated by projecting the internal structures from the computed tomography or magnetic resonance images, onto a virtual X-ray detector surface, and onto a surface of the object, as seen from a position of the X-ray source.

In one example, the system 300 illustrated in FIG. 10, FIG. 11 and FIG. 15 further includes a camera 330, and a display 400. In this example, the camera 330 is configured to generate optical image data representing a two-dimensional surface 370 of the object 360 when the object is received within the examination region 350. The processor 340 is further configured to output to the display 400 an overlay image comprising the image representation of the surface projection 390, and the optical image data representing the two-dimensional surface 370 of the object 360.

In this example, the camera 330 has a field of view, the minimum extent of which is indicated by the dotted lines in FIG. 10, FIG. 11 and FIG. 15, and also by the solid angle $\Omega_{cam}$ in FIG. 15. In general, the field of view of the camera 330 includes the X-ray detector, and also overlaps a portion of the examination region 350. In FIG. 10, FIG. 11 and FIG. 15, the camera 330 is arranged such that a common surface of an object 360 received within the examination region 350 is within the fields of view of both the X-ray source 310 and the camera 330. In so doing, the camera 330 illustrated in FIG. 10, FIG. 11, and FIG. 15 is configured to generate optical image data representing a two-dimensional surface 370 of the object 360 when the object is received within the examination region 350.

In the example arrangement illustrated in FIG. 10 and FIG. 11, the camera 330 is mechanically coupled to the X-ray source 310. The camera 330 is also offset with respect to an axis passing through the X-ray source 310 and a centre of the X-ray detector 320. However, it is noted that the camera 330 may alternatively be positioned differently in order to generate optical image data. For example, the camera 330 may be arranged to provide a view that is coaxial with the X-ray source by inserting a mirror into the path of the X-ray source 110. Alternatively, the camera 330 may be mechanically coupled to a wall, or to a ceiling of a room in which the X-ray imaging system 300 is located. Alternatively, the camera 330 may be mechanically coupled to a floor-based stand in the room. The camera 330 may alternatively be mobile. In some examples, the camera may therefore be capable of being moved around a room in which the X-ray imaging system 300 is located.

The processor 340 illustrated in FIG. 10. FIG. 11 and FIG. 15 is configured to receive the optical image data generated by the camera. The processor 340 may receive the optical image data via any form of digital communication. The processor 340 may receive the optical image data directly or indirectly from the camera 330. The processor 340 and the camera 330 may for example be in communication with each other via a direct wired or wireless communication path, such as an electrical cable or ethernet, or a wireless infrared or RF communication path such as Bluetooth, as illustrated by the arrows connecting these items in FIG. 10 and FIG. 11. Alternatively, the communication path between the camera 330 and the processor 340 may be indirect. For example, the camera 330 and the processor 340 may be in communication with one another via the internet, via the cloud, or via a computer readable storage medium.

In this example, the overlay image includes the representation of the surface projection 390, and the optical image data. The overlay image may be generated by techniques such as setting the pixel values of one of the two images to partially transparent and combining corresponding pixel values in the images. Alternatively, corresponding pixel values in the images may be combined by replacing the pixel values in one of the images with the corresponding pixel values in the other image.

In some examples, additional information may also be included in the surface projection 390 in order to provide further guidance to an operator aligning the object 360 with respect to the X-ray imaging system. This additional information may be outputted to the display 400, or to the projector 410 described above. For example, an image representation of the radiation dose-measurement regions 540 and/or an image representation of the radiation-sensitive region 530 of the X-ray detector and/or an image representation of the collimation window, may also be outputted. Providing this additional information is useful because when the object is disposed in the examination region 350, the object typically obscures the markings on the surface of the X-ray detector 320 that indicate the extent of these regions. Thus, it may be ensured that the desired internal structures, are imaged during a subsequent X-ray imaging operation.

In another example, additional information in the form of corrective actions may be outputted. The corrective actions may be outputted to the display 400, or to the projector 410. Alternatively, the corrective actions may be outputted as audio instructions. In one example, the corrective actions provide guidance to an operator to obtain a desired pose of the structures within the object. This enables the operator to more accurately position the object with respect to the X-ray imaging system, and thus helps to reduce the need to re-take an X-ray image. In this example, the processor 340 is further configured to:

compare an actual pose of the identified one or more internal structures 380 within the object 360, with a desired pose of the one or more internal structures;

compute one or more corrective actions for reducing a difference between the actual pose and the desired pose; and output the corrective actions.

Figure 17:
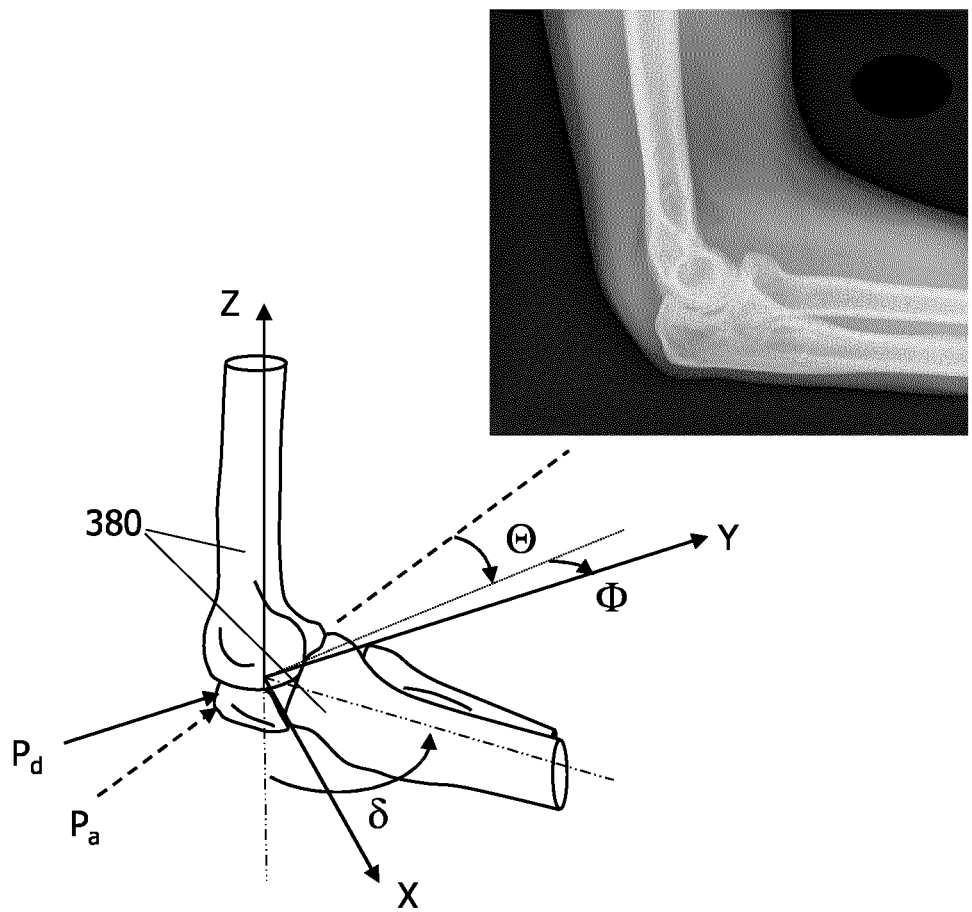
FIG. 17 is a schematic diagram illustrating an example of an anatomical model including internal structures 380 having an actual pose $P_a$, and a desired pose $P_d$, in accordance with a second set of aspects of the present disclosure.

This example is described with reference to FIG. 17, which is a schematic diagram illustrating an example of an anatomical model including internal structures 380 having an actual pose $P_a$, and a desired pose $P_d$, in accordance with a second set of aspects of the present disclosure. In FIG. 17, the actual, i.e. current, positions and orientations of the internal structures 180 of the anatomical model are illustrated, and $P_a$ illustrates an axis passing through the X-ray source and a centre of the X-ray detector 320. In this example, the actual pose may be determined by detecting the internal structures in the X-ray image data. The actual pose of the internal structures 380 may be represented by the parameters of a 6-degrees of freedom "6-DOF" anatomical model, and wherein the axis passing through the X-ray source as a reference orientation, and the centre of the detector as a reference position. Similarly, the desired pose $P_d$ may be expressed as a desired position and orientation of the internal structures of the anatomical model. The desired pose $P_d$ may be determined based on clinical recommendations, or based on a previous X-ray image of the object. The desired pose for the portion of the object may be stored in a lookup table, and selected by an operator during an X-ray imaging procedure. In the illustrated example, the desired pose $P_d$ may be obtained by adjusting the orientation of the anatomical model through the angles Θ and Φ illustrated in FIG. 17.

In this example, the operation of comparing an actual pose of the identified one or more internal structures within the object 360, with a desired pose, may include comparing the parameters of the 6-DOF model of the internal structures 380 in their current positions, with the parameters of the 6-DOF model of the internal structures in their desired positions. The operation of computing one or more corrective actions for reducing a difference between the actual pose and the desired pose, may include determining one or more differences in degrees of freedom represented by the model. These may include translations and/or rotations and/or changes in a flexion angle, the latter being represented by the symbol δ in FIG. 8, of the internal structures. The translations and/or rotations may also include an associated magnitude and/or a direction. These transformations are then outputted as corrective actions. For example, the transformations may include corrective actions such as "Rotate 10 degrees about X-axis". Translate 20 centimetres along Y axis", and so forth. The operations of comparing the actual pose, computing one or more corrective actions, and outputting the corrective actions, may be performed once, or they may be performed multiple times. For example, these operations may be performed repetitively until a difference between the actual pose and the desired pose is within a predetermined value.

As mentioned above, in some examples, the system 300 described above with reference to FIG. 10, FIG. 11 and FIG. 15, includes a projector 410, and in other examples the system 300 includes a display 400. The corrective actions may be outputted to the display and/or to the projector. The corrective actions may be outputted in text format and/or in graphical format. Corrective actions in a graphical format may for example include generating an arrow that is indicative of a direction of the corrective action, and wherein a size of the arrow is indicative of the magnitude of the corrective action. Corrective actions in a graphical format may also be provided in the form of an animation. Instead of, or in addition to outputting the corrective actions to a display or a projector, the corrective actions may be outputted in audio format. In one example, the one or more corrective actions are outputted to a projector for displaying on the object 360. In this example, the projector may be aligned with the X-ray imaging system, and thus with the object, thereby providing that the corrective actions are displayed on the object itself. This may provide more intuitive guidance to the operator in re-positioning the object.

A computer-implemented method, and a computer program product, are also provided in accordance with other Examples.

The example method is illustrated with reference to FIG. 12. With reference to FIG. 12, a computer-implemented method of generating an image representation using an X-ray source 310 and an X-ray detector 320, wherein the X-ray source 110 and the X-ray detector 120 are separated by an examination region 150 for performing an X-ray imaging operation on an object 160 when the object is received within the examination region; is provided. The method comprises:

- receiving S310 X-ray image data, the X-ray image data representing one or more internal structures 380 within the object 360 when the object is received within the examination region 350;
- receiving S320 an anatomical model 430 representing the object 360, the anatomical model including the one or more internal structures 380, and a surrounding tissue 440 that defines a surface of the anatomical model;
- mapping S330 the one or more internal structures 380 from the anatomical model 430 to the one or more corresponding internal structures 380 represented in the X-ray image data, such that the surface of the anatomical model provides an estimated object surface 450 for the one or more internal structures represented in the X-ray image data;
- computing S340, using the anatomical model 430, a surface projection 390 of the one or more internal structures 380, on the estimated object surface 450, from a perspective of the X-ray source 310; and
- outputting S350 an image representation of the surface projection 390 for displaying as an overlay on the surface 370 of the object 360.

With continued reference to FIG. 12, a computer program product comprising instructions which when executed by one or more processors, cause the one or more processors to carry out a method of generating an image representation using an X-ray source 310 and an X-ray detector 320, wherein the X-ray source 110 and the X-ray detector 120 are separated by an examination region 150 for performing an X-ray imaging operation on an object 160 when the object is received within the examination region; is also provided. The method comprises:

- receiving S310 X-ray image data, the X-ray image data representing one or more internal structures 380 within the object 360 when the object is received within the examination region 350;
- receiving S320 an anatomical model 430 representing the object 360, the anatomical model including the one or more internal structures 380, and a surrounding tissue 440 that defines a surface of the anatomical model;
- mapping S330 the one or more internal structures 380 from the anatomical model 430 to the one or more corresponding internal structures 380 represented in the X-ray image data, such that the surface of the anatomical model provides an estimated object surface 450 for the one or more internal structures represented in the X-ray image data;
- computing S340, using the anatomical model 430, a surface projection 390 of the one or more internal structures 380, on the estimated object surface 450, from a perspective of the X-ray source 310; and
- outputting S350 an image representation of the surface projection 390 for displaying as an overlay on the surface 370 of the object 360.

The above examples are to be understood as illustrative of the present disclosure, and not restrictive. Further examples are also contemplated. For instance, the examples described in relation to the X-ray imaging system may also be provided by the computer-implemented method, or by the computer program product, or by the computer-readable storage medium, in a corresponding manner. It is to be understood that a feature described in relation to any one example may be used alone, or in combination with other described features, and may be used in combination with one or more features of another of the examples, or a combination of other examples. Furthermore, equivalents and modifications not described above may also be employed without departing from the scope of the invention, which is defined in the accompanying claims. In the claims, the word "comprising" does not exclude other elements or operations, and the indefinite article "a" or "an" does not exclude a plurality. The mere fact that certain features are recited in mutually different dependent claims does not indicate that a combination of these features cannot be used to advantage. Any reference signs in the claims should not be construed as limiting their scope.

The invention claimed is:

1. An X-ray imaging system, comprising:
   an X-ray source;
   an X-ray detector, wherein the X-ray source and the X-ray detector are separated by an examination region for performing an X-ray imaging operation on an object when the object is received within the examination region;
   a depth sensor configured to generate depth sensor data representing a three-dimensional surface of the object when the object is received within the examination region; and
   a processor configured to:
      receive the depth sensor data;
      identify one or more internal structures within the object based on a comparison of the depth sensor data, with an anatomical model comprising the one or more internal structures;
      compute, using the depth sensor data and the identified one or more internal structures, a surface projection of the one or more internal structures on the surface of the object from a perspective of the X-ray source; and
      output an image representation of the surface projection for displaying as an overlay on the surface of the object.

2. The X-ray imaging system according to claim 1, further comprising a display, and wherein the processor is further configured to output to the display an overlay image comprising the image representation of the surface projection, and the depth sensor data representing the surface of the object.

3. The X-ray imaging system according to claim 1, further comprising a display, wherein the depth sensor is further configured to generate optical image data representing a two-dimensional surface of the object, and wherein the processor is further configured to output to the display an overlay image comprising the image representation of the surface projection, and the optical image data representing the two-dimensional surface of the object.

4. The X-ray imaging system according to claim 1, further comprising a projector, and wherein the processor is further configured to output to the projector the image representation of the surface projection for displaying as an overlay on the surface of the object.

5. The X-ray imaging system according to claim 1, further comprising a display, and wherein the processor is further configured to:
   generate overlay image data representing the image representation of the surface projection, and the depth sensor data representing the surface of the object;
   project the overlay image data onto a radiation-receiving surface of the X-ray detector, from a perspective of the X-ray source;

generate an image representation of the projected overlay image data on the radiation-receiving surface of the X-ray detector, from a perspective of the depth sensor; and output the generated image representation of the projected overlay image data, to the display.

6. The X-ray imaging system according to claim 1, wherein identifying one or more internal structures within the object, and computing a surface projection of the one or more internal structures, are performed using a machine learning algorithm.

7. The X-ray imaging system according to claim 1, wherein the processor is further configured to:

compare an actual pose of the identified one or more internal structures within the object with a desired pose of the one or more internal structures;

compute one or more corrective actions for reducing a difference between the actual pose and the desired pose; and output the corrective actions.

8. The X-ray imaging system according to claim 1, further comprising a display and/or a projector, and wherein the processor is further configured to:

output the one or more corrective actions to the display and/or output the one or more corrective actions to the projector for displaying on the object.

9. The X-ray imaging system according to claim 7, wherein the one or more corrective actions represent one or more translations and/or one or more rotations, and wherein the one or more corrective actions comprise a magnitude and/or a direction.

10. The X-ray imaging system according to claim 1, wherein the anatomical model is provided by one or more of: a plurality of X-ray images representing the object, a computed tomography image representing the object, a magnetic resonance image representing the object.

11. The X-ray imaging system according to claim 1, wherein the processor is further configured to:

select the anatomical model from an anatomical atlas, or from a database of anatomical models representing the object; and register the selected anatomical model to the depth sensor data representing the three-dimensional surface of the object.

12. The X-ray imaging system according to claim 1, wherein receiving the depth sensor data, identifying one or more internal structures within the object, computing a surface projection of the one or more internal structures, and outputting an image representation of the surface projection are performed in at least a first and a second iteration; wherein in the first iteration, the anatomical model is selected from an anatomical atlas, or from a database of anatomical models representing the object, and the selected anatomical model is registered to the object, and the first iteration further comprises generating an X-ray image representing the object; and in the second iteration, the anatomical model is provided by the X-ray image generated during the first iteration.

13. A computer-implemented method for generating an image representation using an X-ray source, an X-ray detector, and a depth sensor, wherein the X-ray source and the X-ray detector are separated by an examination region, the method comprising:

performing an X-ray imaging operation on an object when the object is received within the examination region, and wherein the depth sensor is configured to generate depth sensor data representing a three-dimensional surface of the object when the object is received within the examination region;

receiving the depth sensor data;

identifying one or more internal structures within the object, based on a comparison of the depth sensor data, with an anatomical model comprising the one or more internal structures;

computing, using the depth sensor data and the identified one or more internal structures, a surface projection of the one or more internal structures, on the surface of the object, from a perspective of the X-ray source; and outputting an image representation of the surface projection for displaying as an overlay on the surface of the object.

14. A non-transitory computer-readable medium for storing executable instructions, which cause a method to be performed for generating an image representation using an X-ray source, an X-ray detector, and a depth sensor, wherein the X-ray source and the X-ray detector are separated by an examination region, the method comprising:

performing an X-ray imaging operation on an object when the object is received within the examination region, and wherein the depth sensor is configured to generate depth sensor data representing a three-dimensional surface of the object when the object is received within the examination region;

receiving the depth sensor data;

identifying one or more internal structures within the object based on a comparison of the depth sensor data with an anatomical model comprising the one or more internal structures;

computing, using the depth sensor data and the identified one or more internal structures, a surface projection of the one or more internal structures on the surface of the object from a perspective of the X-ray source; and outputting an image representation of the surface projection for displaying as an overlay on the surface of the object.

15. The X-ray imaging system according to claim 1, wherein the surface projection is computed by back-projecting the positions of the internal structures identified in the model, along virtual paths of X-rays emitted by the X-ray source, and onto the three-dimensional surface of the object that is provided by the depth sensor data.

* * * * *